US009457669B2

(12) United States Patent
Sato et al.

(10) Patent No.: US 9,457,669 B2
(45) Date of Patent: Oct. 4, 2016

(54) BRAKE CONTROL DEVICE AND BRAKE CONTROL METHOD

(71) Applicant: HITACHI AUTOMOTIVE SYSTEMS, LTD., Hitachinaka-shi, Ibaraki (JP)

(72) Inventors: Shinya Sato, Tokyo (JP); Atsushi Yokoyama, Tokyo (JP); Hitoshi Kobayashi, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 45 days.

(21) Appl. No.: 14/398,278

(22) PCT Filed: Apr. 25, 2013

(86) PCT No.: PCT/JP2013/062287
§ 371 (c)(1),
(2) Date: Oct. 31, 2014

(87) PCT Pub. No.: WO2013/164979
PCT Pub. Date: Nov. 7, 2013

(65) Prior Publication Data
US 2015/0123456 A1    May 7, 2015

(30) Foreign Application Priority Data
May 1, 2012   (JP) .................................. 2012-104778

(51) Int. Cl.
B60T 13/74     (2006.01)
B60L 7/26      (2006.01)
(Continued)

(52) U.S. Cl.
CPC ................. B60L 7/26 (2013.01); B60L 1/003 (2013.01); B60L 3/0046 (2013.01); B60L 3/0061 (2013.01);
(Continued)

(58) Field of Classification Search
CPC .............. B60L 7/18; B60L 7/26; B60L 7/14; B60L 1/003; B60L 3/0046; B60L 3/0061; B60L 11/1803; B60L 11/1861; B60L 15/2009; B60L 2240/12; B60L 2240/24; B60L 2240/34; B60L 2240/36; B60L 2240/423; B60L 2240/545; B60L 2240/662; B60T 13/586; B60T 13/66; B60T 13/686; B60T 8/267; B60T 8/4872; B60T 2270/604; B60T 2270/608
USPC ...... 303/3, 10, 11, 20, 151, 152; 701/22, 70, 701/78
See application file for complete search history.

(56) References Cited

U.S. PATENT DOCUMENTS

| 8,744,712 B2 * | 6/2014 | Tashiro ..................... B60L 7/18 |
| | | 303/152 |
| 2010/0127562 A1 * | 5/2010 | Yokoyama ................ B60T 1/10 |
| | | 303/151 |

(Continued)

FOREIGN PATENT DOCUMENTS

| JP | 2004-242460 A | 8/2004 |
| JP | 2006-015819 A | 1/2006 |

(Continued)

*Primary Examiner* — Pamela Rodriguez
(74) *Attorney, Agent, or Firm* — Foley & Lardner LLP

(57) ABSTRACT

A brake control device mounted to a vehicle that comprises a pair of driving wheels and a pair of non-driving wheels controls an upstream brake pressure generated by a master cylinder and downstream brake pressures generated by brake actuators so that, during regenerative braking, the downstream brake pressures to brake devices corresponding to the driving wheels are reduced to be lower than the upstream brake pressure, and the downstream brake pressures to brake devices corresponding to the non-driving wheels are increased to be higher than the upstream brake pressure.

11 Claims, 19 Drawing Sheets

(51) Int. Cl.

| | | |
|---|---|---|
| *B60T 8/26* | (2006.01) | |
| *B60T 8/48* | (2006.01) | |
| *B60L 1/00* | (2006.01) | |
| *B60L 3/00* | (2006.01) | |
| *B60L 7/14* | (2006.01) | |
| *B60L 11/18* | (2006.01) | |
| *B60L 15/20* | (2006.01) | |
| *B60T 13/58* | (2006.01) | |
| *B60T 1/10* | (2006.01) | |
| *F16D 61/00* | (2006.01) | |

(52) U.S. Cl.
CPC .............. *B60L 7/14* (2013.01); *B60L 11/1803* (2013.01); *B60L 11/1861* (2013.01); *B60L 15/2009* (2013.01); *B60T 1/10* (2013.01); *B60T 8/267* (2013.01); *B60T 8/4872* (2013.01); *B60T 13/586* (2013.01); *F16D 61/00* (2013.01); *B60L 2240/12* (2013.01); *B60L 2240/24* (2013.01); *B60L 2240/34* (2013.01); *B60L 2240/36* (2013.01); *B60L 2240/423* (2013.01); *B60L 2240/545* (2013.01); *B60L 2240/662* (2013.01); *B60L 2250/26* (2013.01); *B60T 2270/604* (2013.01); *B60T 2270/608* (2013.01); *Y02T 10/645* (2013.01); *Y02T 10/7005* (2013.01); *Y02T 10/705* (2013.01); *Y02T 10/7044* (2013.01); *Y02T 10/72* (2013.01); *Y02T 10/7275* (2013.01); *Y02T 10/7291* (2013.01); *Y02T 90/16* (2013.01)

(56) References Cited

U.S. PATENT DOCUMENTS

| | | | |
|---|---|---|---|
| 2013/0134768 A1* | 5/2013 | Ito | B60L 3/0092 303/3 |
| 2015/0066326 A1* | 3/2015 | Furuyama | B60T 7/042 701/70 |
| 2015/0291038 A1* | 10/2015 | Akiyama | B60L 3/102 701/22 |

FOREIGN PATENT DOCUMENTS

| | | |
|---|---|---|
| JP | 2006-015952 A | 1/2006 |
| JP | 2009-067268 A | 4/2009 |
| JP | 2011-223648 A | 11/2011 |
| JP | 2012-051455 A | 3/2012 |

* cited by examiner

FIG.4 COMPARISON EXAMPLE

COMPARISON EXAMPLE

⑤ CALCULATE TARGET FLUID PRESSURE BRAKING FORCE

TARGET FRONT WHEEL FLUID
PRESSURE BRAKING FORCE
 $Ff\_h = A - C = D\ [N]$

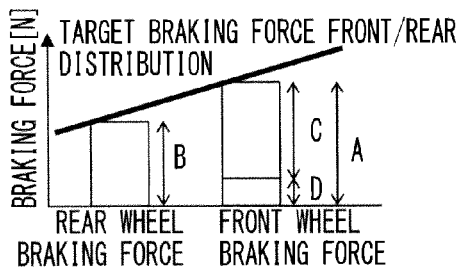

⇩

S606

⑥ FIND TARGET UPSTREAM PRESSURE OPTIMUM VALUE

IN FIGURE AT RIGHT,
FIND UPSTREAM PRESSURE AT WHICH
FLUID PRESSURE ACTUATION AMOUNT
CORRESPONDING TO F
≒ FLUID PRESSURE ACTUATION
AMOUNT CORRESPONDING TO G
(FIND IN MAP OR THE LIKE)

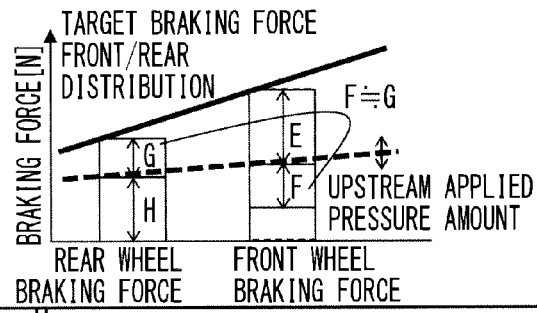

⇩

S607

⑦ CALCULATE TARGET BRAKING FORCE CORRESPONDING TO UPSTREAM PRESSURE

TARGET BRAKING FORCE CORRESPONDING
TO FRONT WHEEL UPSTREAM PRESSURE
 $Ff\_uh = F + D\ [N]$
TARGET BRAKING FORCE CORRESPONDING
TO REAR WHEEL UPSTREAM PRESSURE
 $Fr\_uh = H\ [N]$
TOTAL TARGET BRAKING FORCE
CORRESPONDING TO UPSTREAM PRESSURE
 $Fr\_uh = F + D + H\ [N]$

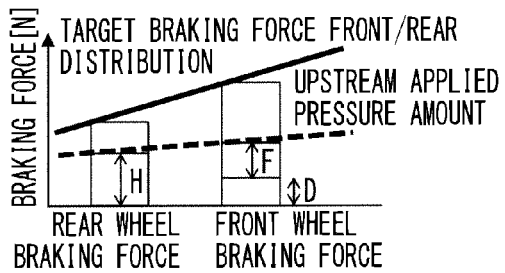

⇩

S608

⑧ CALCULATE TARGET BRAKING FORCE CORRECTION AMOUNT CORRESPONDING TO DOWNSTREAM PRESSURE

TARGET BRAKING FORCE CORRECTION AMOUNT
CORRESPONDING TO FRONT WHEEL DOWNSTREAM
PRESSURE
 $Ff\_lh = -F\ [N]$ (TARGET CONVERGENCE VALUE $= D\ [N]$)
TARGET BRAKING FORCE CORRECTION AMOUNT
CORRESPONDING TO REAR WHEEL DOWNSTREAM
PRESSURE
 $Fr\_lh = G\ [N]$ (TARGET CONVERGENCE VALUE $= B\ [N]$)

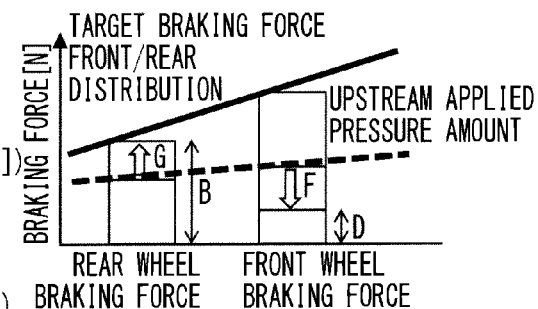

⑨ CHECK COORDINATED REGENERATIVE BRAKING CONTROL TARGET PARAMETERS
TARGET FRONT WHEEL BRAKING FORCE($Ff$)=A[N]
 TARGET REGENERATIVE BRAKING FORCE($Ff\_r$)=C[N]
 TARGET FRONT WHEEL FLUID PRESSURE BRAKING FORCE($Ff\_h$)=D[N]
  TARGET BRAKING FORCE CORRESPONDING TO FRONT WHEEL UPSTREAM
  PRESSURE ($Ff\_uh$)=F+D[N]
  TARGET BRAKING FORCE CORRECTION AMOUNT CORRESPONDING TO FRONT
  WHEEL DOWNSTREAM PRESSURE ($Ff\_lh$)=-F[N]
TARGET REAR WHEEL BRAKING FORCE($Fr$)=B[N]
 TARGET BRAKING FORCE CORRESPONDING TO REAR WHEEL UPSTREAM
 PRESSURE($Fr\_uh$)=H[N]
 TARGET BRAKING FORCE CORRECTION AMOUNT CORRESPONDING TO REAR
 WHEEL DOWNSTREAM PRESSURE($Fr\_lh$)=G[N]

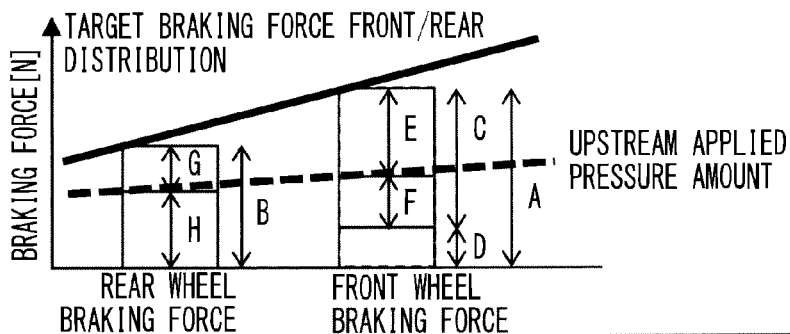

⑩ COORDINATED REGENERATIVE BRAKING CONTROL
MOTOR ECU
 · TARGET REGENERATIVE BRAKING FORCE($Ff\_r$)=C[N]
UPSTREAM BRAKE PRESSURE CONTROL UNIT
 · TOTAL TARGET BRAKING FORCE CORRESPONDING TO UPSTREAM
PRESSURE($F\_uh$)=F+D+H[N]
DOWNSTREAM BRAKE PRESSURE CONTROL UNIT
 · TARGET FRONT WHEEL FLUID PRESSURE BRAKING FORCE($Ff\_h$)=D[N]
 · TARGET REAR WHEEL BRAKING FORCE($Fr$)=B[N]

END

FIG.11
○ WHEN BRAKE STEPPING ON AMOUNT INCREASES
A' > A
B' > B
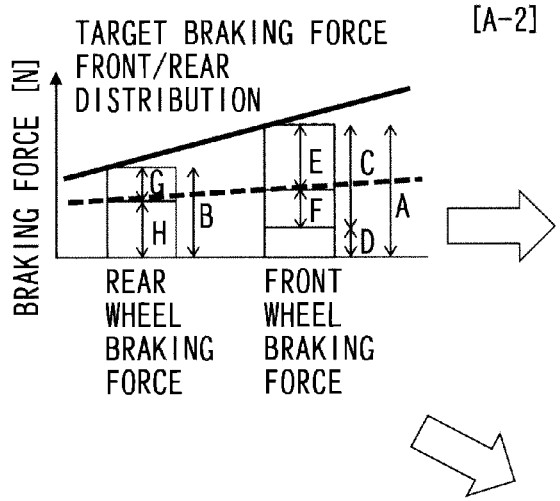
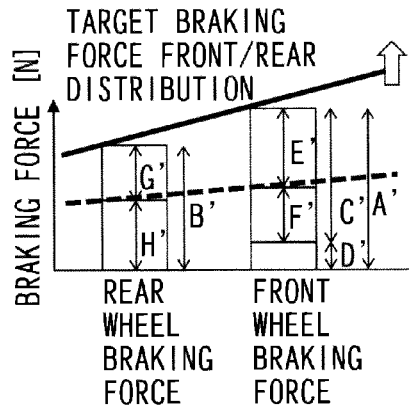
[A-1] WHEN REGENERATION AMOUNT INCREASE COMMAND ISSUED (C' > C)
[A-2] WHEN REGENERATION AMOUNT MAINTENANCE COMMAND ISSUED (C' ≒ C)
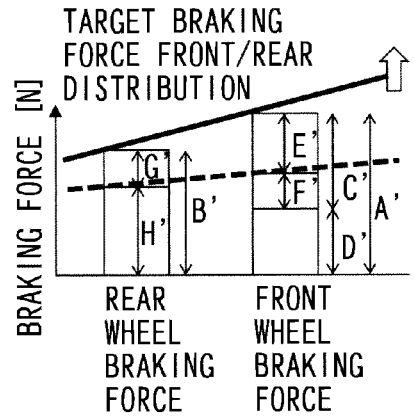
[A-3] WHEN REGENERATION AMOUNT REDUCTION COMMAND ISSUED (C' < C)
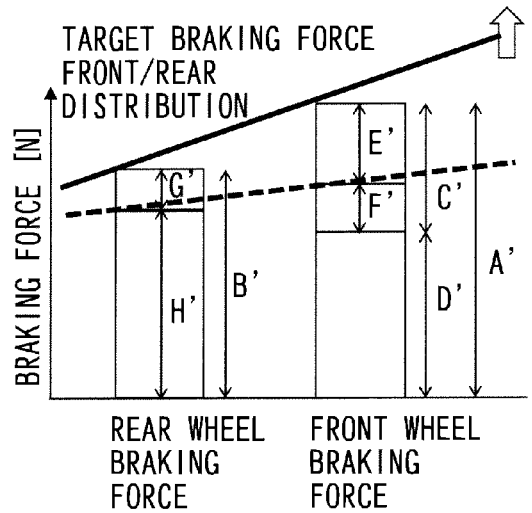

FIG.12
○ WHEN BRAKE IS RETURNED
A' < A
B' < B
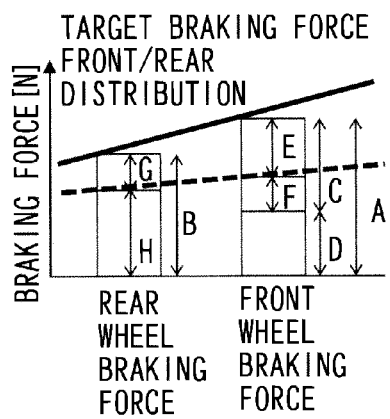
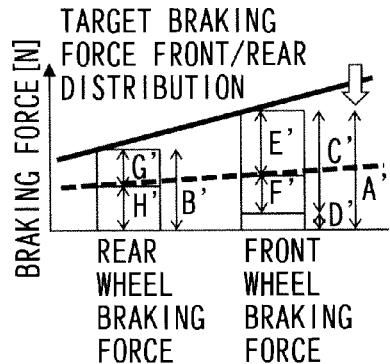
[B-1] WHEN REGENERATION AMOUNT INCREASE COMMAND ISSUED (C' > C)
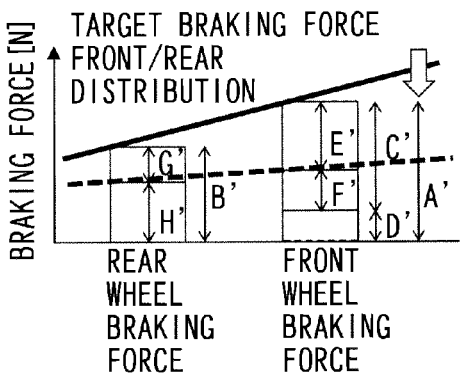
[B-2] WHEN REGENERATION AMOUNT MAINTENANCE COMMAND ISSUED (C' ≒ C)
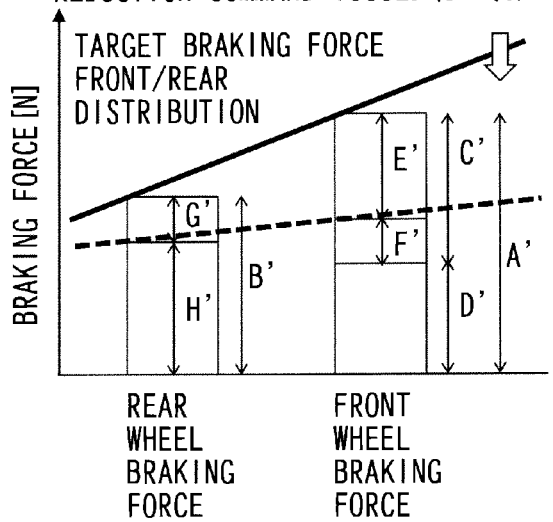
[B-3] WHEN REGENERATION AMOUNT REDUCTION COMMAND ISSUED (C' < C)

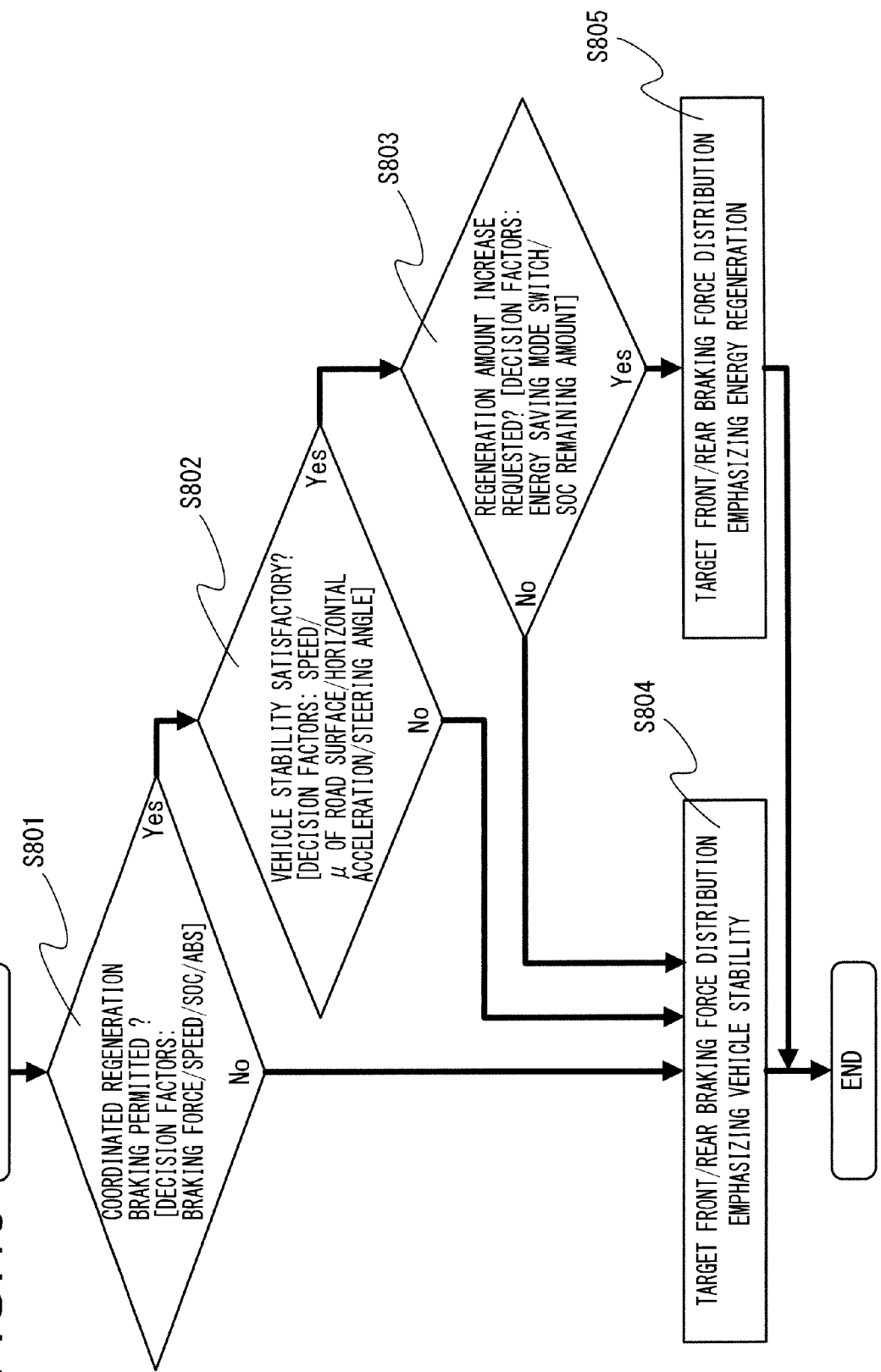

BRAKE CONTROL DEVICE AND BRAKE CONTROL METHOD

TECHNICAL FIELD

The present invention relates to a brake control device for a vehicle, and to a brake control method.

BACKGROUND ART

In the prior art, with an electrically propelled vehicle such as an HEV (a hybrid electric vehicle) or an EV (an electric vehicle) or the like, generally, during braking, regenerative braking is used together with friction brakes that are operated by fluid pressure. In Patent Document #1, a control device for an electrically propelled vehicle is disclosed with which it is anticipated to stabilize the behavior of the vehicle during regenerative braking by performing coordinated regeneration control in which a master cylinder provided on the upstream side and brake actuators that are provided on the downstream side are employed in parallel with regenerative braking.

CITATION LIST

Patent Literature

Patent Document #1: Japanese Laid-Open Patent Publication 2011-223648.

SUMMARY OF INVENTION

Technical Problem

With the control device disclosed in Patent Document #1 described above, the coordinated regeneration control is performed by determining a regeneration torque such that the braking torque distribution upon the regenerative braking wheels does not become excessive, and a frictional braking torque is calculated and the brake actuators are controlled so as to supplement the amount of shortage of this regeneration torque for providing a target braking torque. However, with this type of control method, it is not possible to optimize the upstream braking pressure due to the master cylinder and the downstream braking pressures due to the brake actuators according to the state of the vehicle, and because of this it is not possible to provide high braking performance.

The present invention has been conceived in consideration of problems such as described above, and its principal object is to implement coordinated regeneration control with which it is possible to provide high braking performance.

Solution to Technical Problem

A brake control device according to an aspect of the present invention is mounted to a vehicle that comprises a pair of driving wheels and a pair of non-driving wheels. The vehicle to which this brake control device is mounted includes: a plurality of brake devices, one provided to correspond to each one of the driving wheels and the non-driving wheels, that provide braking forces to the wheels due to brake fluid pressures; a master cylinder that generates a common upstream brake pressure for the brake devices; brake actuators that generate individual downstream brake pressures for the brake devices on the basis of the upstream brake pressure; and a regenerative braking unit that performs regenerative braking for the driving wheels. The brake control device controls the upstream brake pressure and the downstream brake pressures so that, during regenerative braking by the regenerative braking unit, the downstream brake pressures to the brake devices corresponding to the driving wheels are reduced to be lower than the upstream brake pressure, and the downstream brake pressures to the brake devices corresponding to the non-driving wheels are increased to be higher than the upstream brake pressure.

A brake control method according to an aspect of the present invention is adapted to a vehicle that includes a pair of driving wheels and a pair of non-driving wheels, and that further includes: a plurality of brake devices, one provided to correspond to each one of the driving wheels and the non-driving wheels, that provide braking forces to the wheels due to brake fluid pressures; a master cylinder that generates a common upstream brake pressure for the brake devices; brake actuators that generate individual downstream brake pressures for the brake devices on the basis of the upstream brake pressure; a regenerative braking unit that performs regenerative braking for the driving wheels; and a brake control device that controls the upstream brake pressure and the downstream brake pressures. In this brake control method, during regenerative braking by the regenerative braking unit, the upstream brake pressure and the downstream brake pressures are controlled by the brake control device, so that the downstream brake pressures to the brake devices corresponding to the driving wheels are reduced to be lower than the upstream brake pressure, and the downstream brake pressures to the brake devices corresponding to the non-driving wheels are increased to be higher than the upstream brake pressure.

Advantageous Effects of Invention

According to the present invention it is possible to implement coordinated regeneration control that is capable of providing high braking performance.

BRIEF DESCRIPTION OF DRAWINGS

FIG. 9 is another figure showing a flow chart of calculation for coordinated regenerative braking control according to the front and rear wheel braking force correction method;

FIG. 10 is yet another figure showing a flow chart of calculation for coordinated regenerative braking control according to the front and rear wheel braking force correction method;

FIG. 11 is a figure showing an example of transient behavior when the brake pedal stepping-on amount is increased;

FIG. 12 is a figure showing an example of transient behavior when the brake pedal stepping-on amount is returned;

FIG. 19 is a figure showing processing for selecting a target braking force distribution.

DESCRIPTION OF EMBODIMENTS

Embodiment #1

Figure 1:
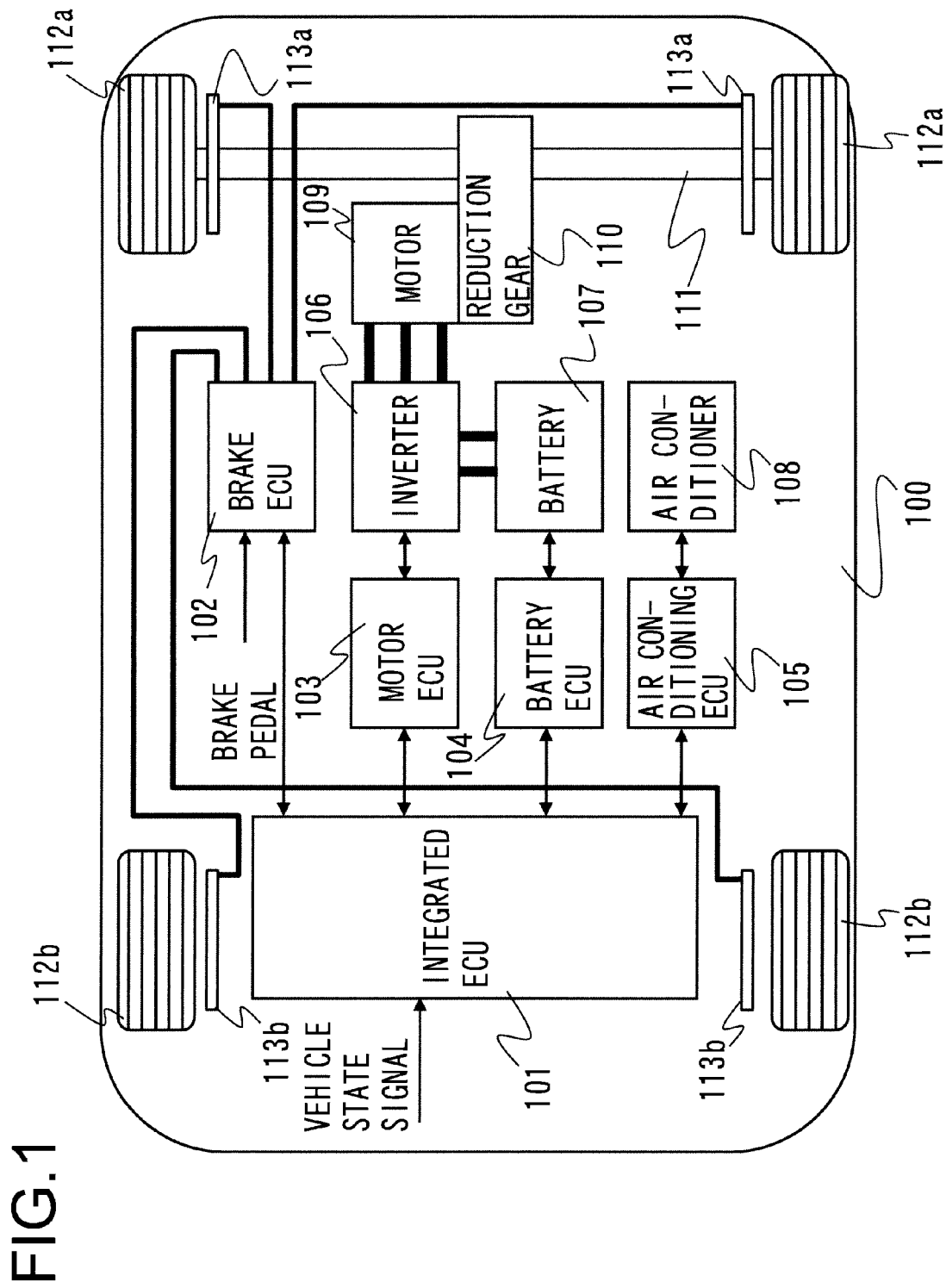
FIG. 1 is a figure showing the system structure of an electric vehicle.

A first embodiment of the present invention will now be explained. FIG. 1 is a figure showing the system structure of a vehicle 100 that is an electric vehicle of the FF (front motor, front drive) type, to which is mounted a brake ECU 102 that serves as a brake control device according to the present invention.

As shown in FIG. 1, this vehicle 100 comprises an integrated ECU 101, a brake ECU 102, a motor ECU 103, a battery ECU 104, an air conditioning ECU 105, an inverter 106, a battery 107, an air conditioner 108, a motor 109 and a reduction gear 110. Furthermore, the vehicle 100 comprises a pair of front wheels 112a provided at the two ends of a wheel shaft 111 that is connected to the reduction gear 110, a pair of rear wheels 112b, and pairs of brake devices 113a and 113b that are respectively provided to correspond to these pairs of wheels.

Signals of various kinds outputted from the vehicle 100 related to various states of the vehicle are inputted to the integrated ECU 101, such as, for example, a vehicle speed signal, an accelerator opening amount signal, a brake pedal signal, a steering wheel angle signal, an energy saving mode signal, an external air temperature signal, and so on. In the following "vehicle state signals" will be employed as a generic term for these signals inputted to the integrated ECU 101. On the basis of these vehicle state signals, the integrated ECU 101 calculates control command values of various types, and transmits corresponding control command values to the brake ECU 102, the motor ECU 103, the battery ECU 104, and the air conditioning ECU 105 respectively.

The brake pedal signal, which corresponds to the amount of actuation of the brake pedal of the vehicle 100, is inputted to the brake ECU 102. On the basis of this brake pedal signal and control command values of various types such as a braking command and a target regenerative braking force and so on that are outputted from the integrated ECU 101 according to requirements, the brake ECU 102 controls the brake pressures to the brake devices 113a and 113b, so as to ensure that the desired braking force is obtained for each of the wheels of the vehicle 100. It should be understood that the contents of the control performed by this brake ECU 102 will be described in detail hereinafter.

On the basis of a motor drive command value outputted from the integrated ECU 101, the motor ECU 103 commands the inverter 106 to produce electrical power at a required level for supply to the motor. And, according to this command from the motor ECU 103, the inverter 106 converts DC power supplied from the battery 107 into AC power, and outputs that AC power to the motor 109. The motor 109 operates using this AC power from the inverter 106, and generates motor driving force. This motor driving force generated by the motor 109 is transmitted to the front wheels 112a, i.e. to the driving wheels, via the reduction gear 110 and the wheel shaft 111. Due to this, the front wheels 112a are rotated and the vehicle 100 is propelled.

It should be understood that, with this vehicle 100, it is also possible for regenerative braking force to be obtained due to the motor 109 being caused to perform regenerative braking according to a command from the motor ECU 103. During such regenerative braking, the motor 109 is operated as a generator by drive force that is transmitted from the front wheels 112a via the wheel shaft 111 and the reduction gear 110, so that AC power is generated from the motor 109. After having been converted into DC power by the inverter 106, this AC power charges up the battery 107.

The battery ECU 104 monitors the voltage, the temperature, the state of charge (SOC) and so on of the battery 107, and performs management of charging and discharging and diagnosis of anomalies and so on. Moreover, according to requirements, the battery ECU 104 gathers battery information of various kinds from the battery 107 according to a command from the integrated ECU 101, and outputs this battery information to the integrated ECU 101.

And the air conditioning ECU 105 measures the air temperature in the passenger compartment of the vehicle 100, and outputs this internal air temperature to the integrated ECU 101. The integrated ECU 101 determines a target passenger compartment air temperature on the basis of the result of this measurement of the passenger compartment internal air temperature, the operational state of the vehicle 100, the charge state of the battery 107, and so on, and outputs an air temperature adjustment command to the air conditioning ECU 105. The air conditioning ECU 105 controls the air conditioner 108 on the basis of this temperature adjustment command, and thereby regulates the air temperature in the passenger compartment of the vehicle 100.

Figure 2:
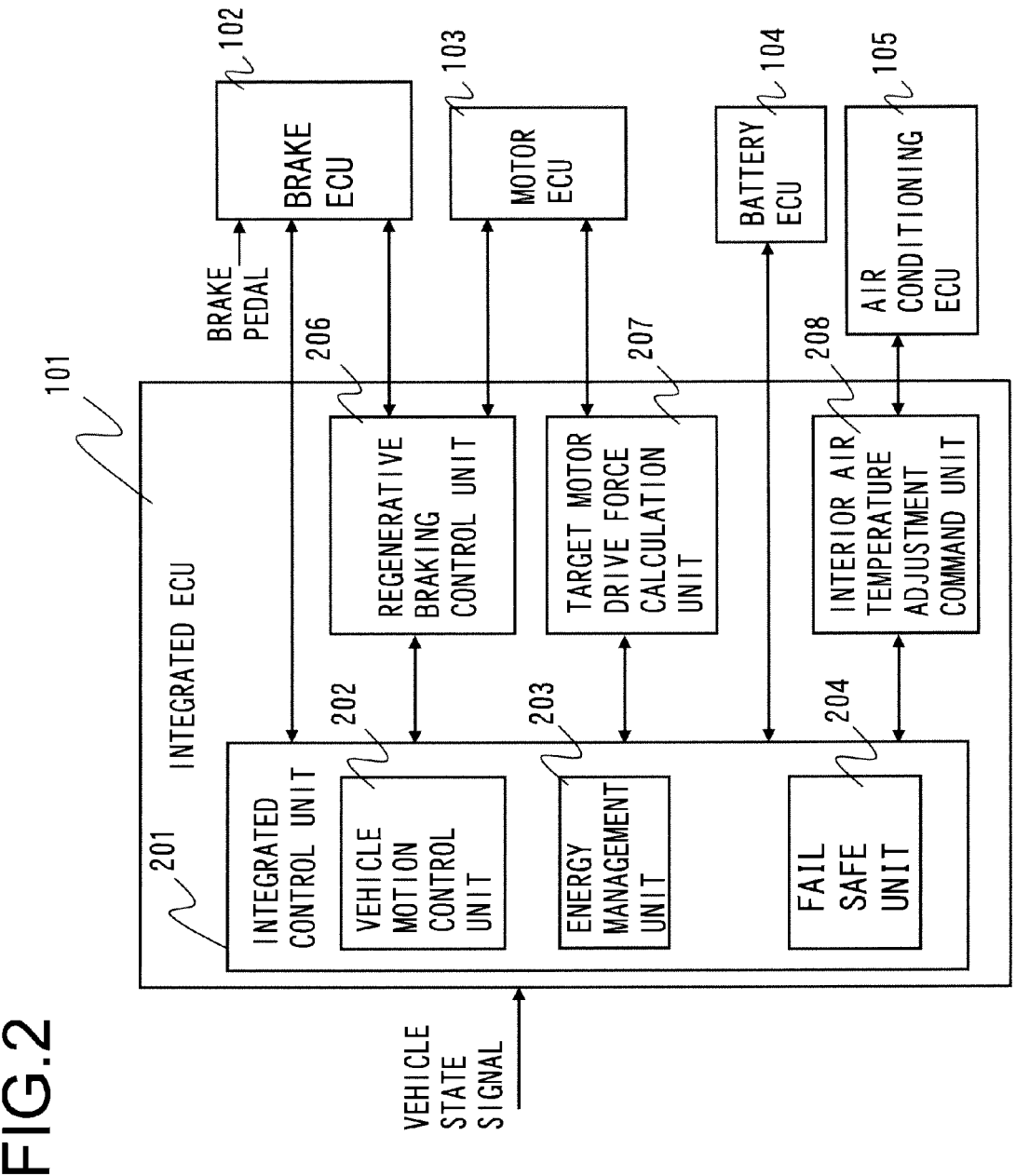
FIG. 2 is a figure showing the details of calculation by an integrated ECU.

FIG. 2 is a figure showing the details of calculation by the integrated ECU 101 of FIG. 1. Functionally, the integrated ECU 101 comprises: a higher ranking integrated control unit 201 that internally includes control modules such as a vehicle motion control unit 202, an energy management unit 203, and a fail safe unit 204; and a regenerative braking control unit 206, a target motor drive force calculation unit 207, and an interior air temperature adjustment command unit 208 that are equivalent to lower ranking control modules with respect to the integrated control unit 201.

In the integrated control unit 201, the vehicle motion control unit 202 calculates a braking command value and a target torque value for establishing the desired state of motion of the vehicle 100 (i.e., for establishing its desired running state), on the basis of the vehicle speed signal, the accelerator opening amount signal, the steering wheel angle signal and so on that are included in the vehicle state signals from the vehicle 100. And these calculated results are outputted to the brake ECU 102 and to the target motor drive force calculation unit 207.

The energy management unit 203 decides upon the charge state of the battery 107 on the basis of the battery information from the battery ECU 104. And, on the basis of the result of this charge state decision, an energy saving mode signal that is included in the vehicle state signals from the vehicle 100, the result of measurement of the air temperature in the vehicle passenger compartment from the air conditioning ECU 105, and so on, the energy management unit 203 performs control for appropriately managing the energy state of the vehicle 100. For example, the energy management unit 203 may output a command to the regenerative braking control unit 206 for initiating starting of regenerative braking, or may output a command to the interior air temperature adjustment command unit 208 for setting the target passenger compartment air temperature according to the energy state of the vehicle.

On the basis of the vehicle state signal from the vehicle 100 and the battery information from the battery ECU 104, the fail safe unit 204 determines whether or not an anomalous state of the vehicle 100 is present. Moreover, if it is decided that an anomaly has occurred, then the fail safe unit 204 performs control corresponding to the state of this anomaly. For example, if an anomaly has occurred in the temperature of the motor 109, then the fail safe unit 204 outputs a command to the target motor drive force calculation unit 207 in order to limit the output of the motor 109.

Corresponding to the command from the energy management unit 203, the regenerative braking control unit 206 calculates the target regenerative braking force during regenerative braking, and outputs the result of this calculation to the brake ECU 102 and to the motor ECU 103. At this time, the target regenerative braking force is calculated on the basis of the vehicle speed signal included in the vehicle state signals from the vehicle 100, the battery charge state (SOC) and the temperature of the battery 107 included in the battery information from the battery ECU 104, and so on. Using this result of calculating the target regenerative braking force, coordinated regenerative braking control that will be described hereinafter is performed by the brake ECU 102, and thereby the brake fluid pressures to the brake devices 113a and 113b are controlled. On the other hand, the inverter 106 is controlled by the motor ECU 103 on the basis of the target regenerative braking force, so that it is arranged for the motor 109 to be caused to perform regenerative braking so that regenerative braking force is obtained.

The target motor drive force calculation unit 207 calculates a motor drive command value on the basis of a target torque value from the vehicle motion control unit 202, and outputs the result of this calculation to the motor ECU 103.

And the interior air temperature adjustment command unit 208 sets a target passenger compartment air temperature according to a command from the energy management unit 203, and outputs a temperature adjustment command to the air conditioning ECU 105.

Figure 3:
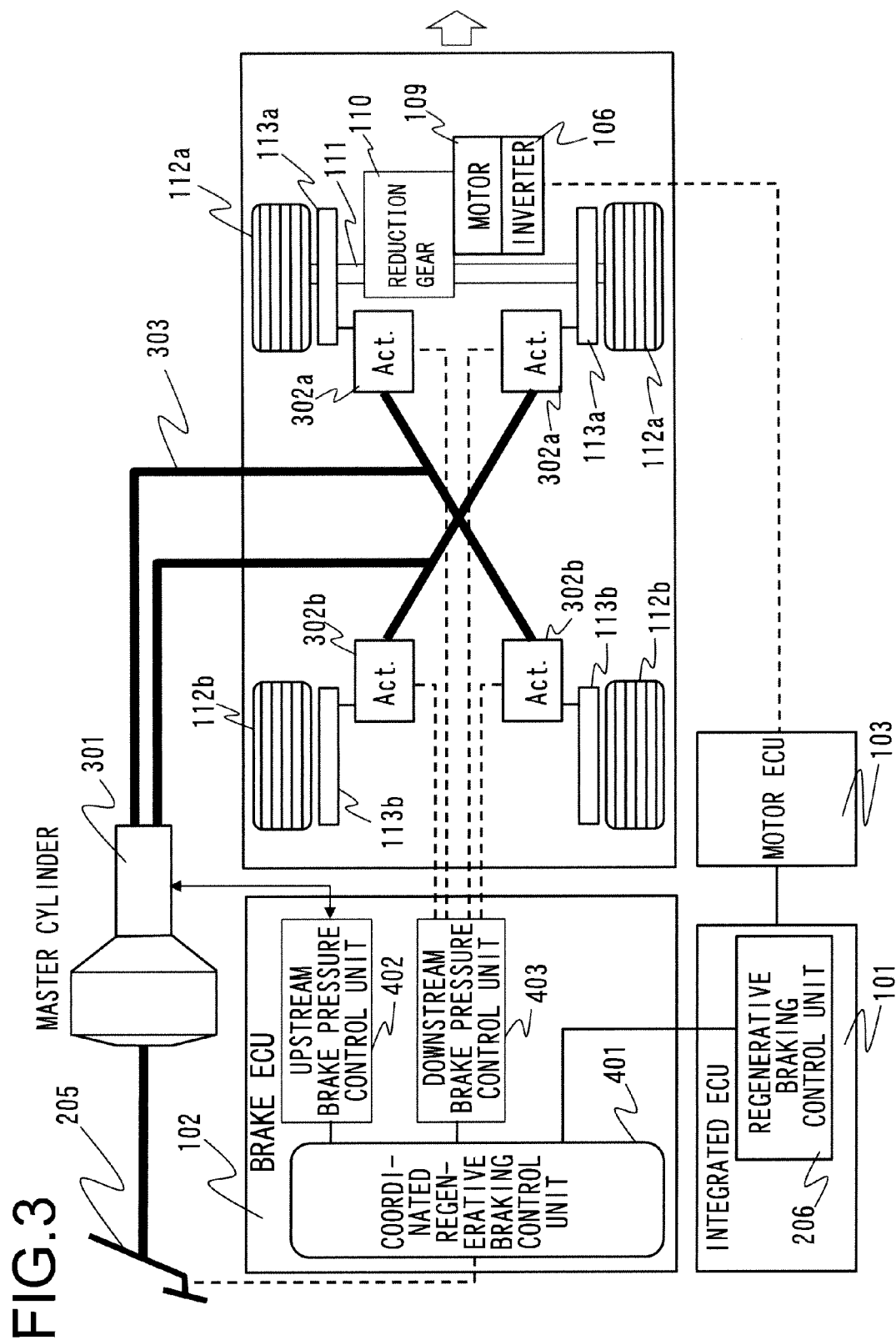
FIG. 3 is a figure showing the structure of a portion related to coordinated regenerative braking control.

Next, the details of the control performed by the brake ECU 102 will be explained. As previously described, during regenerative braking, the brake fluid pressures to the brake devices 113a and 113b are controlled due to coordinated regenerative braking control being performed by the brake ECU 102. FIG. 3 is a figure showing the structure of a portion of the vehicle 100 related to this coordinated regenerative braking control. In the following, the coordinated regenerative braking control performed by the brake ECU 102 will be explained with reference to FIG. 3.

Functionally, the brake ECU 102 in FIG. 3 comprises a coordinated regenerative braking control unit 401, an upstream brake pressure control unit 402, and a downstream brake pressure control unit 403. When a brake pedal 205 is actuated by the driver of the vehicle 100, a brake pedal signal that corresponds to the amount of this actuation is outputted to the brake ECU 102. And, in the brake ECU 102, this brake pedal signal is inputted to the coordinated regenerative braking control unit 401. Moreover, the previously described target regenerative braking force calculated by the regenerative braking control unit 206 of the integrated ECU 101 is also inputted to the coordinated regenerative braking control unit 401 in the brake ECU 102.

The coordinated regenerative braking control unit 401 performs calculations of various types required for coordinated regenerative braking control on the basis of the brake pedal signal and the target regenerative braking force that are inputted. And the results of these calculations are outputted both to the upstream brake pressure control unit 402 and also to the downstream brake pressure control unit 403. It should be understood that the concrete contents of these calculations performed by the coordinated regenerative braking control unit 401 will be explained in detail hereinafter.

The upstream brake pressure control unit 402 controls the operation of a master cylinder 301 on the basis of the calculation result from the coordinated regenerative braking control unit 401, and adjusts an upstream brake pressure generated from the master cylinder 301. The master cylinder 301 supplies pressurized brake fluid (i.e. brake oil) via pressure conduits 303, both to the brake devices 113a of the front wheels 112a and also to the brake devices 113b of the rear wheels 112b, in flow amounts corresponding to this upstream brake pressure after adjustment. It should be understood that the upstream brake pressure generated by the master cylinder 301 is common to the brake devices 113a and 113b.

The brake fluid supplied to the brake devices 113a and 113b from the master cylinder 301 is inputted to two pairs of brake actuators 302a and 302b. The two brake actuators 302a are provided to the pair of front wheels 112a respectively, and generate individual respective downstream brake pressures for the two brake devices 113a on the basis of the upstream brake pressure from the master cylinder 301. In a similar manner, the two brake actuators 302b are provided to the pair of rear wheels 112b respectively, and generate individual respective downstream brake pressures for the two brake devices 113b on the basis of the upstream brake pressure from the master cylinder 301.

The downstream brake pressure control unit 403 controls the operation of the pairs of brake actuators 302a and 302b on the basis of the results of calculation from the coordinated regenerative braking control unit 401, and thereby adjusts the downstream brake pressures respectively generated by the brake actuators 302a and 302b. According to these downstream brake pressures after adjustment, each of the brake actuators 302a and 302b raises or lowers the pressure of the brake fluid supplied from the master cylinder 301, and thereby supplies brake fluid to the corresponding one of the pairs of brake devices 113a and 113h. In this manner, the brake devices 113a and 113b are operated by brake fluid being supplied from the brake actuators 302a and 302h to the brake devices 113a and 113b. As a result, fluid pressure braking forces, in other words braking forces due to the brake fluid pressures, are provided from the brake devices 113a and 113b to each of the two front wheels 112a and to each of the two rear wheels 112b.

It should be understood that the fluid pressure conduits 303 are divided partway along into two systems. One of these systems is connected between the brake actuator 302a and the brake device 113a corresponding to the left side front wheel 112a, and the brake actuator 302b and the brake device 113b corresponding to the right side rear wheel 112b. And the other of these systems is connected between the brake actuator 302a and the brake device 113a corresponding to the right side front wheel 112a, and the brake actuator 302b and the brake device 113b corresponding to the left side rear wheel 112b. This type of structure for the fluid pressure conduits 303 is termed the "X conduit type".

Brake fluid outputted according to the upstream brake pressure from the master cylinder 301 is outputted via each of the fluid pressure conduits 303 to the brake actuators 302a and 302b respectively. And, after these pressures have been lowered or raised by the brake actuators 302a and 302b to the respective downstream brake pressures, they are outputted to the respective brake devices 113a and 113b via each of the fluid pressure conduits 303.

On the basis of the target regenerative braking force calculated by the regenerative braking control unit 206 of the integrated ECU 101, the motor ECU 103 outputs a command to the inverter 106 for causing the motor 109 to perform regenerative braking. The wheel shaft 111 of the front wheels 112a, i.e. of the driving wheels, is connected to the motor 109 via the reduction gear 110. During regenerative braking, the rotational motion of this wheel shaft 111 is transmitted to the motor 109 via the reduction gear 110, and the motor 109 functions as a generator. Due to this, the motor 109 functions as a regenerating brake, and regenerative braking force is obtained for the front wheels 112a corresponding to the amount of electrical power generated by the motor 109.

Figure 4:
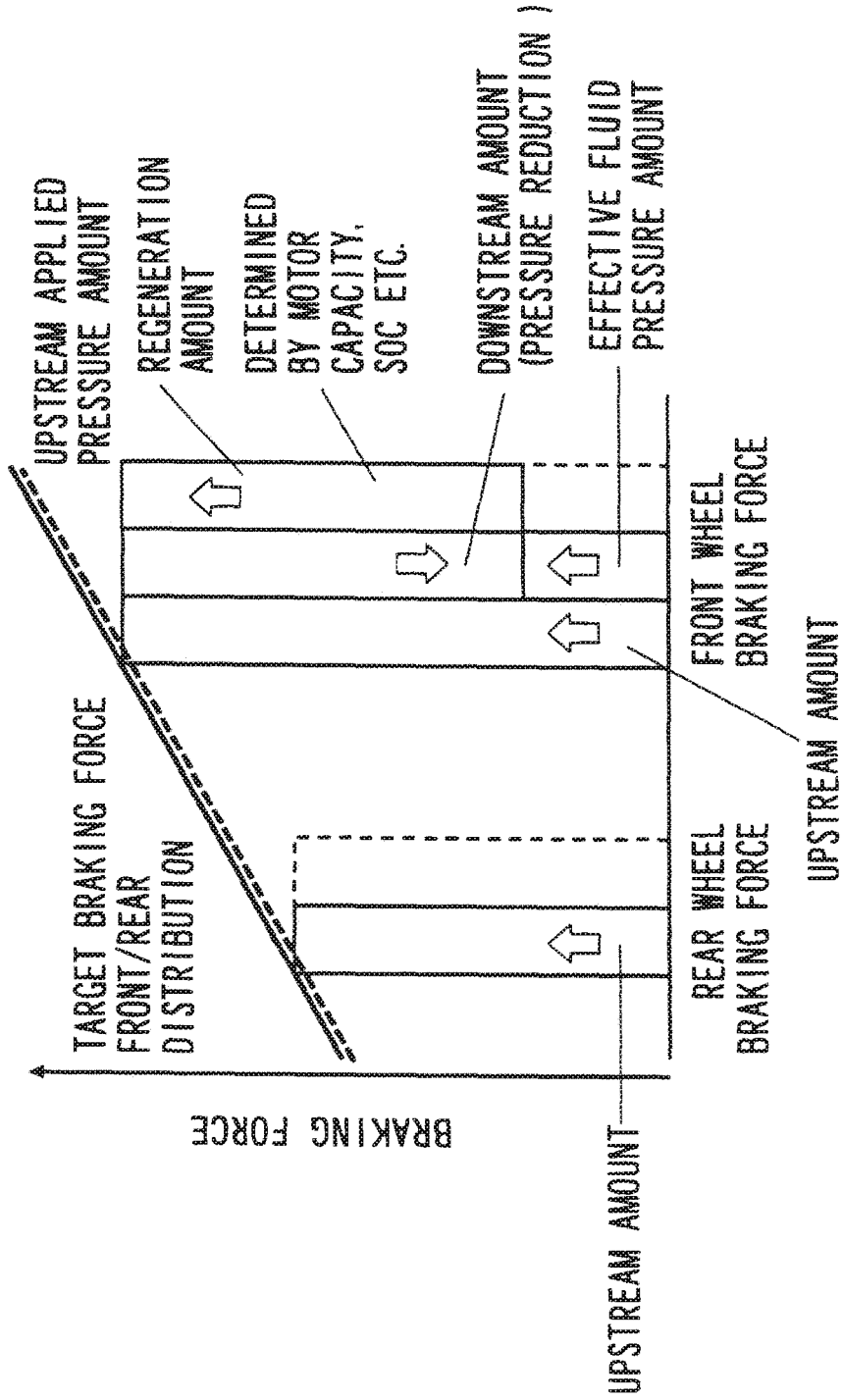
FIG. 4 is a figure showing a summary of coordinated regenerative braking control according to a driving wheel braking force correction method.
Figure 5:
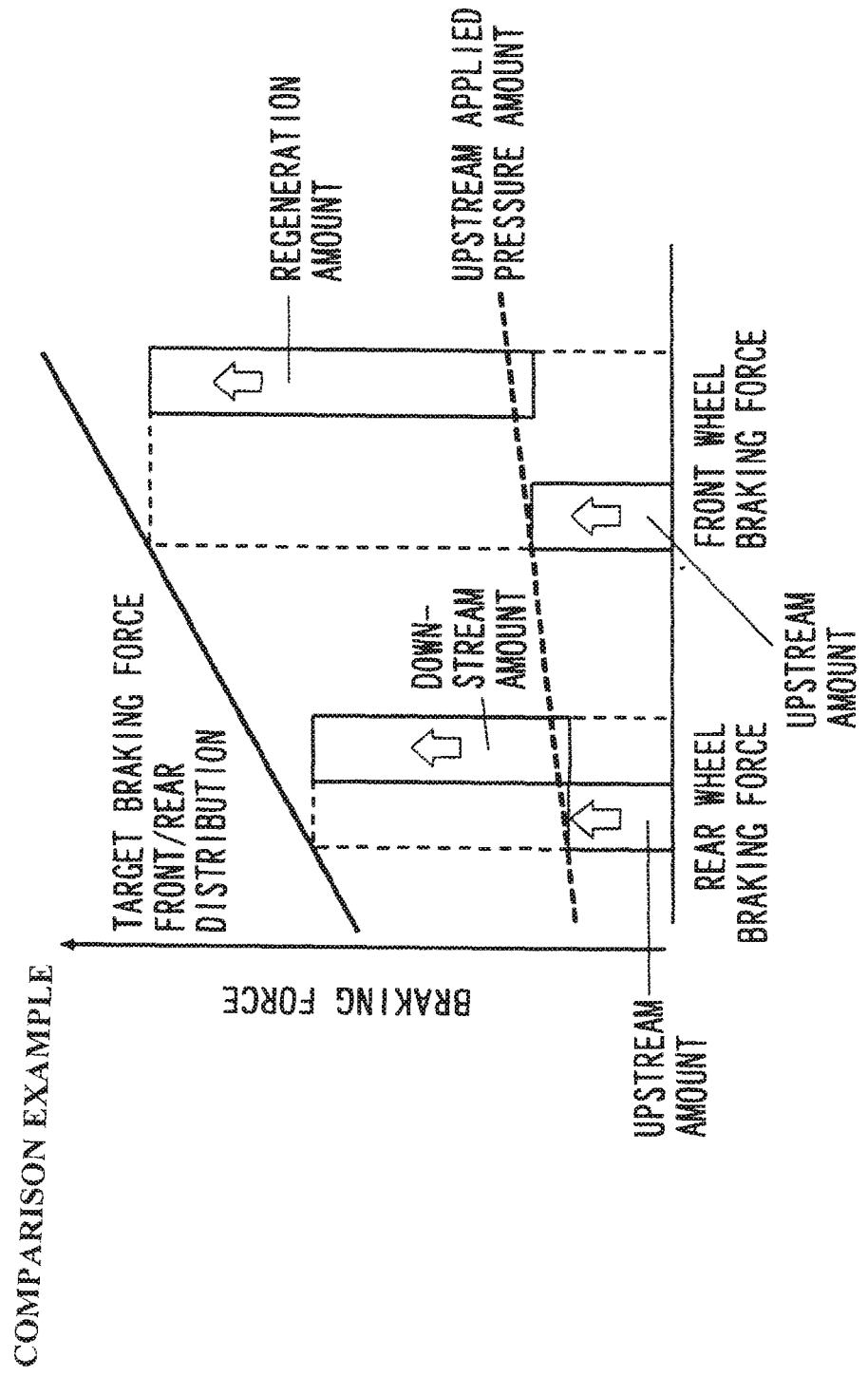
FIG. 5 is a figure showing a summary of coordinated regenerative braking control according to a non-driving wheel braking force correction method.
Figure 6:
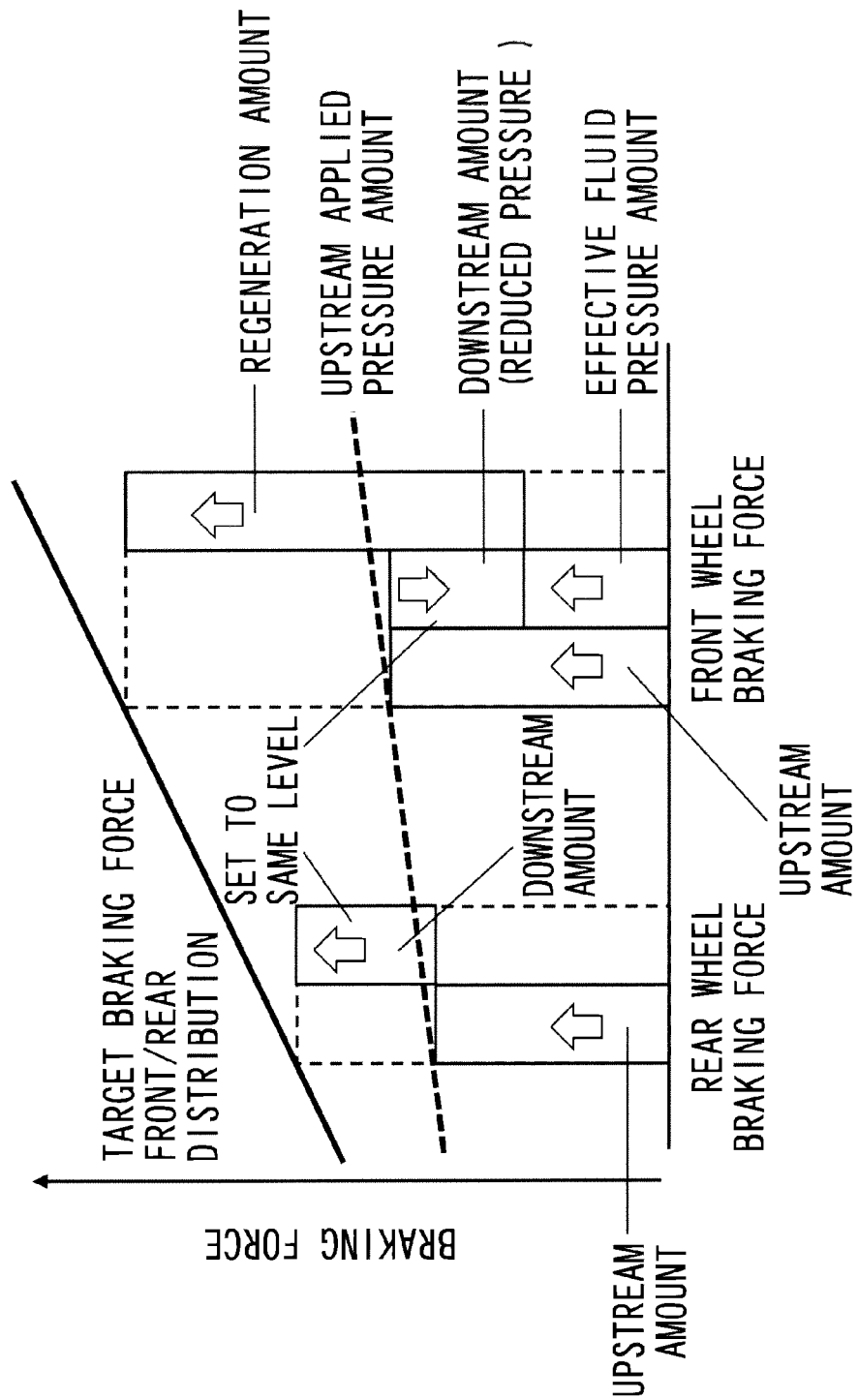
FIG. 6 is a figure showing a summary of coordinated regenerative braking control according to a front and rear wheel braking force correction method of the present invention.

Next, a summary of the coordinated regenerative braking control performed by the brake ECU 102 will be explained. FIGS. 4 and 5 are both summaries of coordinated regenerative braking control according to control methods of comparison examples, while FIG. 6 is a summary of the coordinated regenerative braking control according to the present invention.

FIG. 4 is a summary of coordinated regenerative braking control according to a comparison example, this comparison example being a driving wheel braking force correction method. As shown in FIG. 4, with this coordinated regenerative braking control according to the driving wheel braking force correction method, a target braking force for the front wheels and a target braking force for the rear wheels both allocated to the upstream applied pressure are determined to match a target front wheel braking force and a target rear wheel braking force respectively, which are determined according to a predetermined target braking force front/rear distribution, and the upstream brake pressure is set to correspond thereto. Furthermore, a target braking force for the front wheels allocated to the downstream applied pressure is determined to match a target braking force of the effective fluid pressure obtained by subtracting the amount of regenerative braking force as determined from the capacity of the motor and the charge state of the battery (SOC) and so on from the target front wheel braking force, and the downstream brake pressure is set to correspond thereto. Due to this, it is arranged for the target braking force for the effective fluid pressure amount for the front wheel side, i.e. for the driving wheels, to be obtained by reducing the upstream brake pressure to the downstream brake pressure.

When the coordinated regenerative braking control according to the driving wheel braking force correction method of the type explained above is employed, it is possible to perform control in a simple manner. However, when the regenerative braking force becomes great, correspondingly thereto, the required dynamic range for the downstream brake pressure for the front wheel side also becomes great. Accordingly, it is necessary to provide a large sized reservoir tank and a high performance fluid pressure pump and so on, so that there is a possibility that the demerit of cost increase or the like will be entailed.

FIG. 5 is a summary of coordinated regenerative braking control according to another comparison example, this comparison example being a non-driving wheel braking force correction method. As shown in FIG. 5, with this coordinated regenerative braking control according to the non-driving wheel braking force correction method, the target braking force for the front wheels and the target braking force for the rear wheels both allocated to the upstream applied pressure are determined so that the total of the target braking force for the front wheels allocated to the upstream applied pressure and the regenerative braking force agrees with the target front wheel braking force that is determined according to the predetermined target braking force front/rear distribution, and the upstream brake pressure is set to correspond thereto. Furthermore, a target braking force for the rear wheels allocated to the downstream applied pressure is determined to match the target rear wheel braking force, and the downstream brake pressure is set to correspond thereto. Due to this, it is arranged for the target braking force for the rear wheel side, i.e. for the non-driving wheels, to be obtained by increasing the upstream brake pressure to the downstream brake pressure, thus supplementing the brake pressure shortage amount.

When the coordinated regenerative braking control according to the non-driving wheel braking force correction method of the type explained above is employed, in a similar manner to the case for the coordinated regenerative braking control according to the driving wheel braking force correction method shown in FIG. 4, when the regenerative braking amount becomes great, corresponding thereto, the required dynamic range for the downstream brake pressure for the rear wheel side also becomes great. Accordingly, it is necessary to provide a large sized reservoir tank and a high performance fluid pressure pump and so on, so that there is a possibility that the demerit of cost increase or the like will be entailed.

FIG. 6 is a summary of the coordinated regenerative braking control according to the front and rear wheel braking force correction method of the present invention. As shown in FIG. 6, with this coordinated regenerative braking control according to the front and rear wheel braking force correction method, the target braking force for the front wheels and the target braking force for the rear wheels both allocated to the upstream applied pressure are determined so that they become intermediate between those shown in FIG. 4 and those shown in FIG. 5 respectively, and the upstream brake pressure is set so as to correspond thereto. And the downstream brake pressures both for the front wheel side and for the rear wheel side are set on the basis of this upstream brake pressure. In other words for the front wheel side, i.e. for the driving wheels, in a similar manner to the case with the driving wheel braking force correction method shown in FIG. 4, the target braking force for the front wheels allocated to the downstream applied pressure is determined to match the target braking force of the effective fluid pressure obtained by subtracting the amount of regenerative braking force from the target front wheel braking force, and the downstream brake pressure is set so as to correspond thereto. On the other hand, for the rear wheel side, i.e. for the non-driving wheels, in a similar manner to the case with the non-driving wheel braking force correction method shown in FIG. 5, the target braking force for the rear wheels allocated to the downstream applied pressure is determined to match the target rear wheel braking force, and the downstream brake pressure is set to correspond thereto. Due to this, the upstream brake pressure and the downstream brake pressures are each set so that the brake fluid reduction amount corresponding to the amount of pressure reduction from the upstream brake pressure to the downstream brake pressure for the front wheel side, and the brake fluid increase amount corresponding to the amount of pressure increase from the upstream brake pressure to the downstream brake pressure for the rear wheel side, fall within predetermined ranges that may be considered as being almost the same.

With the present invention, by applying the coordinated regenerative braking control according to the front and rear wheel braking force correction method as explained above, it is possible to obtain the target front wheel braking force and the target rear wheel braking force by reducing the downstream brake pressure for the front wheel side to be lower than the upstream brake pressure, while raising the downstream brake pressure for the rear wheel side to be higher than the upstream brake pressure. In other words, it is possible to make the directions of correction (the polarities of correction) of the brake pressures on the downstream side be opposite for the front wheel side and for the rear wheel side. Due to this, it is possible to reduce the dynamic ranges of downstream brake pressure that are required for the front wheel side and for the rear wheel side, as compared to the case when either the driving wheel braking force correction method described above or the non-driving wheel braking force correction method described above is employed.

Moreover, with the coordinated regenerative braking control according to the front and rear wheel braking force correction method, it is arranged for the brake fluid reduction amount on the front wheel side corresponding to the amount of pressure reduction from the upstream brake pressure to the downstream brake pressure, and the brake fluid increase amount on the rear wheel side corresponding to the amount of pressure increase from the upstream brake pressure to the downstream brake pressure, to become almost of the same level. Due to this, it is possible to ensure that almost the same amounts of brake fluid shifts via the X conduit type fluid pressure conduits 303 described above between the brake actuators 302*a* and the brake devices 113*a* for the front wheel side, and the brake actuators 302*b* and the brake devices 113*b* for the rear wheel side. In other words, it is possible to make the gain and loss between the brake fluid amount of the pressure reduction on the front wheel side and the brake fluid amount of the pressure increase on the rear wheel side agree with one another, so that it is possible to utilize the same mass of brake fluid without any overall excess or shortage occurring in the entire brake system. Due to this, it becomes unnecessary to provide any large sized reservoir tank such as was required when employing the driving wheel braking force correction method or the non-driving wheel braking force correction method described above.

Figure 7:
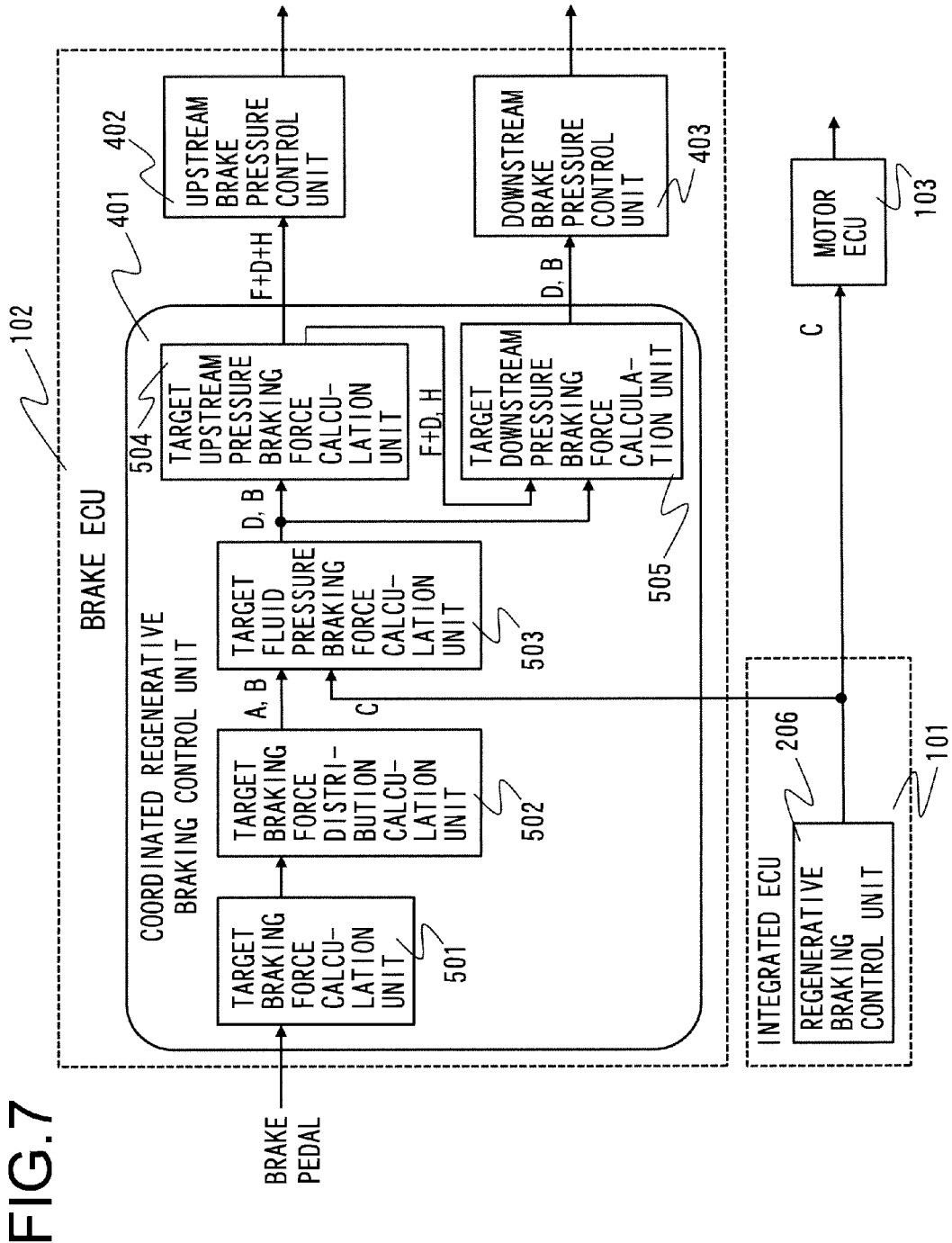
FIG. 7 is a figure showing control blocks of coordinated regenerative braking control according to the front and rear wheel braking force correction method.

FIG. 7 is a control block diagram for the coordinated regenerative braking control according to the front and rear wheel braking force correction method explained above with reference to FIG. 6. As shown in FIG. 3, functionally, the brake ECU 102 comprises the coordinated regenerative braking control unit 401, the upstream brake pressure control unit 402, and the downstream brake pressure control unit 403. And, among these, the coordinated regenerative braking control unit 401 comprises a target braking force calculation unit 501, a target braking force distribution calculation unit 502, a target fluid pressure braking force calculation unit 503, a target upstream pressure braking force calculation unit 504, and a target downstream pressure braking force calculation unit 505.

The target braking force calculation unit 501 calculates a target braking force for the vehicle 100 on the basis of brake actuation amount information specified by a brake pedal signal from the brake pedal 205. The result of this calculation of target braking force is outputted to the target braking force distribution calculation unit 502.

On the basis of the target braking force from the target braking force calculation unit 501, the target braking force distribution calculation unit 502 calculates a front/rear distribution for the target braking force, and distributes the target braking force to the front wheels, i.e. to the driving wheels, and to the rear wheels, i.e. to the non-driving wheels. Due to this, a target braking force for the front wheels (i.e. a target front wheel braking force) and a target braking force for the rear wheels (i.e. a target rear wheel braking force) are obtained. The results of calculating these target braking forces are outputted to the target fluid pressure braking force calculation unit 503.

The target fluid pressure braking force calculation unit 503 calculates a target fluid pressure braking force for the front wheels, i.e. for the driving wheels, in other words a target force for the braking by the brake devices 113*a*, on the basis of the target front wheel braking force and the target rear wheel braking force from the target braking force distribution calculation unit 502 and the target regenerative braking force from the regenerative braking control unit 206. The result of calculating this target fluid pressure braking force is outputted to the target upstream pressure braking force calculation unit 504 and to the target downstream pressure braking force calculation unit 505, together with the target rear wheel braking force.

On the basis of the target fluid pressure braking force and the target rear wheel braking force from the target fluid pressure braking force calculation unit 503, the target upstream pressure braking force calculation unit 504 calculates the target braking force for the front wheels and the target braking force for the rear wheels allocated to the upstream applied pressure, in other words calculates braking forces that correspond to the target value for the upstream brake pressure. In the following, the target braking force allocated to the upstream applied pressure that is obtained for the front wheels will be termed the "target braking force corresponding to the front wheel upstream pressure", and the target braking force allocated to the upstream applied pressure that is obtained for the rear wheels will be termed the "target braking force corresponding to the rear wheel upstream pressure". Moreover, a target total braking force allocated to the upstream applied pressure (i.e. a total target braking force corresponding to the upstream pressure) is calculated by adding together the results of these calculations, and the result of this calculation is outputted to the upstream brake pressure control unit 402. Furthermore, the target braking force corresponding to the front wheel upstream pressure and the target braking force corresponding to the rear wheel upstream pressure are both outputted to the target downstream pressure braking force calculation unit 505.

On the basis of the target fluid pressure braking force and the target rear wheel braking force from the target fluid pressure braking force calculation unit 503, and the target braking force corresponding to the front wheel upstream pressure and the target braking force corresponding to the rear wheel upstream pressure from the target upstream pressure braking force calculation unit 504, the target downstream pressure braking force calculation unit 505 calculates correction amounts of the target braking force for the front wheels and correction amounts of the target braking force for the rear wheels both allocated to the downstream applied pressure, in other words calculates correction amounts of the braking forces corresponding to the pressure reduction amounts (in the case of the front wheels) or the pressure increase amounts (in the case of the rear wheels) from the upstream brake pressure to the downstream brake pressures. In the following, the correction amounts of the target braking force allocated to the downstream applied pressure that is obtained for the front wheels will be termed the "target braking force correction amount corresponding to the front wheel downstream pressure", and the correction amounts of the target braking force allocated to the downstream applied pressure that is obtained for the rear wheels will be termed the "target braking force correction amount corresponding to the rear wheel downstream pressure", respectively. And the target fluid pressure braking force and the target rear wheel braking force corresponding to the results of these calculations are outputted to the downstream brake pressure control unit 403.

On the basis of the result of calculation of the total target braking force corresponding to the upstream pressure outputted from the target upstream pressure braking force calculation unit 504, the upstream brake pressure control unit 402 sets a target value for the upstream brake pressure. The operation of the master cylinder 301 is controlled and the upstream brake pressure is adjusted, so that the upstream brake pressure generated from the master cylinder 301 agrees with this target value for the upstream brake pressure.

On the basis of the target fluid pressure braking force outputted from the target downstream pressure braking force calculation unit 505, the downstream brake pressure control unit 403 sets a target value for the downstream brake pressure for the brake actuators 302a on the front wheel side. Moreover, on the basis of the target rear wheel braking force outputted from the target downstream pressure braking force calculation unit 505, the downstream brake pressure control unit 403 sets a target value for the downstream brake pressure for the brake actuators 302b on the rear wheel side. The operation of the brake actuators 302a and 302b is controlled and the downstream brake pressures are adjusted, so that these target values for the downstream brake pressures and the downstream brake pressures generated from the brake actuators 302a and 302b agree with one another.

Figure 8:
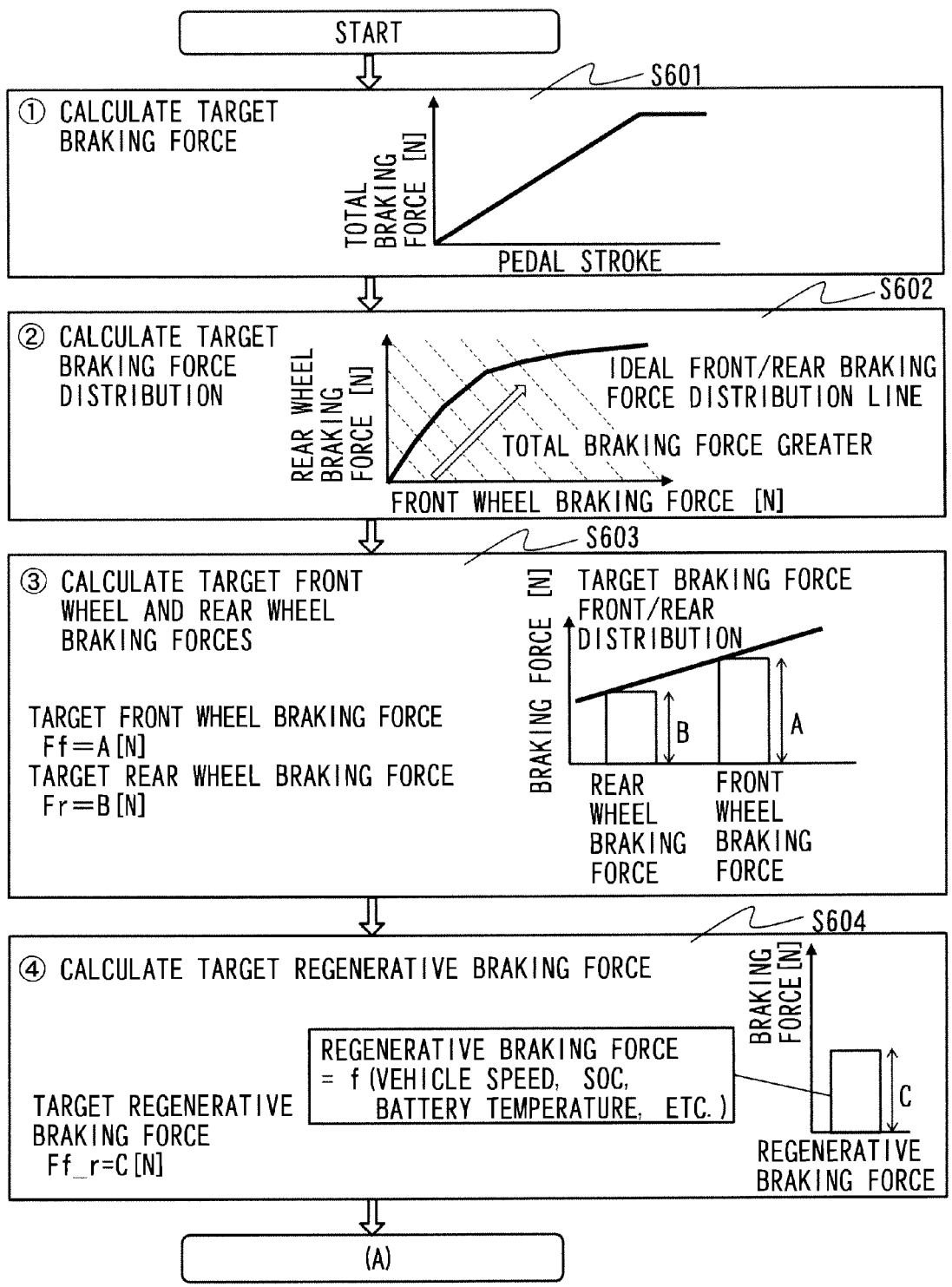
FIG. 8 is a figure showing a flow chart of calculation for coordinated regenerative braking control according to the front and rear wheel braking force correction method.

Next, the processing for performing calculation of the coordinated regenerative braking control according to the front and rear wheel braking force correction method will be explained. FIGS. 8, 9, and 10 are flow charts of calculation for the coordinated regenerative braking control according to the front and rear wheel braking force correction method. In the following, the details of this calculation processing will be explained in concrete terms with reference to these flow charts.

In step S601 of FIG. 8, the target braking force for the vehicle 100 is calculated by the target braking force calculation unit 501. Here, the brake actuation amount is specified on the basis of the brake pedal signal from the brake pedal 205. And a total braking force corresponding to this brake actuation amount is obtained on the basis of a relationship between pedal stroke and total braking force like that shown in FIG. 8, and this is taken as being the target braking force for the vehicle 100. It should be understood that the relationship between pedal stroke and total braking force like that shown in FIG. 8 is obtained in advance according to the characteristics of the vehicle 100 and so on, and information for specifying it is stored in advance in the brake ECU 102.

Then in step S602, on the basis of an ideal front/rear braking force distribution line like that shown in FIG. 8, the distribution of the target braking force calculated in step S601 to the front wheels and to the rear wheels is calculated by the target braking force distribution calculation unit 502. It should be understood that the ideal front/rear braking force distribution line shown in FIG. 8 indicates that, the greater the total braking force becomes, the greater the allocation of braking force to the front wheel side must be relative to the allocation to the rear wheel side, and this line is determined in advance according to the characteristics of the vehicle 100 and so on.

Then in step S603 the target front wheel braking force (Ff) and the target rear wheel braking force (Fr) are calculated by the target braking force distribution calculation unit 502, according to the target braking force distribution calculated in step S602. As shown in FIG. 8, when the value of the target front wheel braking force (Ft) calculated here is termed A and the value of the target front wheel braking force (Ff) calculated here is termed B, these values are respectively expressed by the following Equations (1) and (2):

$$\text{target front wheel braking force}(Ff)=A[N] \tag{1}$$

$$\text{target rear wheel braking force}(Fr)=B[N] \tag{2}$$

It should be understood that it would also be acceptable to arrange for the calculations of steps S602 and S603 described above both to be executed by the target braking force distribution calculation unit 502. For example, a function that takes the total braking force as argument and that outputs the front wheel braking force and the rear wheel drive force on the basis of an ideal front/rear braking force distribution line like that shown in FIG. 8, or tabular information for the front wheel braking force and the rear wheel drive force for the total braking force, may be stored in advance by the brake ECU 102. By employing a function or tabular information of this type, it is possible to calculate the target front wheel braking force (Ff) and the target rear wheel braking force (Fr) directly from the target braking force.

The value A of the target front wheel braking force (Ff) and the value B of the target rear wheel braking force (Fr) calculated in step S603 are outputted from the target braking force distribution calculation unit 502 to the target fluid pressure braking force calculation unit 503.

Then in step S604 the target regenerative braking force (Ff_r) is calculated by the regenerative braking control unit 206. Here, as previously described, it is possible to obtain this target regenerative braking force (Ff_r) by using a function or the like that has been determined in advance, on the basis of the vehicle speed signal included in the vehicle state signals from the vehicle 100, and the state of charge (SOC) and the temperature and so on of the battery 107 included in the battery information from the battery ECU 104. As shown in FIG. 8, when the value of the target regenerative braking force (Ff_r) calculated here is termed C, this value is expressed by the following Equation (3):

$$\text{target regenerative braking force}(Ff\_r)=C[N] \quad (3)$$

In step S605 of FIG. 9, the value C of the target regenerative braking force (Ff_r) calculated in step S604 is acquired from the regenerative braking control unit 206 by the target fluid pressure braking force calculation unit 503. And, on the basis of the value A of the target front wheel braking force (Ff) calculated in step S603 and the value C of the target regenerative braking force (Ff_r) acquired from the regenerative braking control unit 206, the target front wheel fluid pressure braking force (Ff_h) is calculated according to Equation (4) below:

$$\text{target front wheel fluid pressure braking force}(Ff\_h)=Ff-Ff\_r=A-C[N] \quad (4)$$

Here, when Equation (4) is rewritten as A−C=D as shown in FIG. 9, the following Equation (5) is obtained, and the value D of the target front wheel fluid pressure braking force (Ff_h) is obtained:

$$\text{target front wheel fluid pressure braking force}(Ff\_h)=D[N] \quad (5)$$

The value D of the target front wheel fluid pressure braking force (Ff_h) calculated in step S605 and the value B of the target rear wheel braking force (Fr) inputted from the target braking force distribution calculation unit 502 are outputted from the target fluid pressure braking force calculation unit 503 to the target upstream pressure braking force calculation unit 504 and the target downstream pressure braking force calculation unit 505.

Then in step S606, on the basis of the value D of the target front wheel fluid pressure braking force (Ff_h) and the value B of the target rear wheel braking force (Fr) inputted from the target fluid pressure braking force calculation unit 503, the target braking force corresponding to the front wheel upstream pressure (Ff_uh) for the front wheels and the target braking force corresponding to the rear wheel upstream pressure (Fr_uh) for the rear wheels are calculated by the target upstream pressure braking force calculation unit 504. Here, as previously described the target braking force corresponding to the front wheel upstream pressure (Ff_uh) and the target braking force corresponding to the rear wheel upstream pressure (Fr_uh) are calculated so that the brake fluid decrease amount on the front wheel side corresponding to the pressure reduction amount from the upstream brake pressure to the downstream brake pressure, and the brake fluid increase amount on the rear wheel side corresponding to the pressure increase amount from the upstream brake pressure to the downstream brake pressure, become on almost the same level.

Here, the decrease amount of the braking force corresponding to the brake fluid decrease amount on the front wheel side can be expressed as the difference F between the target braking force corresponding to the front wheel upstream pressure (Ff_uh) and the value D of the target front wheel fluid pressure braking force (Ff_h) in FIG. 9. Moreover, the increase amount of the braking force corresponding to the brake fluid increase amount on the rear wheel side can be expressed as the difference G between the value B of the target rear wheel braking force (Fr) and the target braking force corresponding to the rear wheel upstream pressure (Fr_uh) in FIG. 9. Accordingly, the target braking force corresponding to the front wheel upstream pressure (Ff_uh) and the target braking force corresponding to the rear wheel upstream pressure (Fr_uh) are determined so that the brake fluid amount corresponding to the difference F and the brake fluid amount corresponding to the difference G become almost the same.

The slope of the broken line shown in FIG. 9 indicates, for the given upstream brake pressure, the relationship between the target braking force corresponding to the front wheel upstream pressure (Ff_uh) and the target braking force corresponding to the rear wheel upstream pressure (Fr_uh). This is determined from the characteristics of the front wheel side brake devices 113*a* and the rear wheel side brake devices 113*b*. On the basis of this type of relationship, for example, for each combination of the value D of the front wheel fluid pressure braking force (Ff_h) and the value B of the target rear wheel braking force (Fr), the values of the optimum upstream brake pressure, and of the target braking force corresponding to the front wheel upstream pressure (Ff_uh) and the target braking force corresponding to the rear wheel upstream pressure (Fr_uh) corresponding thereto, are put into a table, and the resulting tabular information is stored in advance in the brake ECU 102. By using this tabular information, it is possible to find the upstream brake pressure for which the brake fluid decrease amount on the front wheel side, in other words the brake fluid amount corresponding to the difference F, and the brake fluid increase amount on the rear wheel side, in other words the brake fluid amount corresponding to the difference G, become almost the same, and it is possible to calculate the target braking force corresponding to the front wheel upstream pressure (Ff_uh) and the target braking force corresponding to the rear wheel upstream pressure (Fr_uh) corresponding thereto.

It should be understood that there is no need for the brake fluid amount corresponding to the differential F described above and the brake fluid amount corresponding to the differential G necessarily to agree with one another perfectly. It will also be acceptable for a certain disparity between them to be present, provided that this disparity is within a predetermined range that corresponds to the capacity of a reservoir tank mounted to the vehicle 100.

Then in step S607 the value of the target braking force corresponding to the front wheel upstream pressure (Ff_uh) and the value of the target braking force corresponding to the rear wheel upstream pressure (Fr_uh) described above are checked by the target upstream pressure braking force calculation unit 504. Using the differences F and G described previously, these values may respectively be given by Equations (6) and (7) below:

$$\text{target braking force corresponding to the front wheel upstream pressure}(Ff\_uh)=F+D[N] \quad (6)$$

$$\text{target braking force corresponding to the rear wheel upstream pressure}(Fr\_uh)=B-G[N] \quad (7)$$

Here, if Equation (7) is rewritten as B−G=H as shown in FIG. 9, then the following Equation (8) is obtained, and the value H of the target braking force corresponding to the rear wheel upstream pressure (Fr_uh) may be obtained:

$$\text{target braking force corresponding to the rear wheel upstream pressure}(Fr\_uh)=H[N] \quad (8)$$

Moreover, in step S607, the total target braking force corresponding to the upstream pressure (F_uh) is calculated by the value of the above described target braking force corresponding to the front wheel upstream pressure (Ff_uh) and the value of the target braking force corresponding to the rear wheel upstream pressure (Fr_uh) being added together by the target upstream pressure braking force calculation unit 504. This is obtained according to Equation (9) described below:

$$\text{total target braking force corresponding to the upstream pressure}(F\_uh)F+D+H[N] \quad (9)$$

The value F+D+H of the total target braking force corresponding to the upstream pressure (F_uh) calculated in step S607 is outputted from the target upstream pressure braking force calculation unit 504 to the upstream brake pressure control unit 402. Moreover, the value F+D of the target braking force corresponding to the front wheel upstream pressure (Ff_uh) and the value H of the target braking force corresponding to the rear wheel upstream pressure (Fr_uh) are outputted from the target upstream pressure braking force calculation unit 504 to the target downstream pressure braking force calculation unit 505.

Then in step S608, on the basis of the value D of the target front wheel fluid pressure braking force (Ff_h) and the value B of the target rear wheel braking force (Fr) inputted from the target fluid pressure braking force calculation unit 503, and on the basis of the value F+D of the target braking force corresponding to the front wheel upstream pressure (Ff_uh) and the value H of the target braking force corresponding to the rear wheel upstream pressure (Fr_uh) inputted from the target upstream pressure braking force calculation unit 504, the target braking force correction amount corresponding to the front wheel downstream pressure (Ff_lh) for the front wheels and the target braking force correction amount corresponding to the rear wheel downstream pressure (Fr_lh) for the rear wheels are calculated by the target downstream pressure braking force calculation unit 505 according to Equations (10) and (11) below. It should be understood that, as previously described, the target braking force correction value (Ff_lh) corresponding to the front wheel downstream pressure gives a target braking force correction amount for the downstream applied pressure corresponding to the pressure reduction amount, from the upstream brake pressure to the downstream brake pressure, for the front wheels. In a similar manner, the target braking force correction value (Fr_lh) corresponding to the target rear wheel downstream pressure gives a target braking force correction amount for the downstream applied pressure corresponding to the pressure increase amount, from the upstream brake pressure to the downstream brake pressure, for the rear wheels.

$$\text{target braking force correction amount corresponding to the front wheel downstream pressure}(Ff\_lh)=Ff\_h-Ff\_uh=-F[N] \quad (10)$$

$$\text{target braking force correction amount corresponding to the rear wheel downstream pressure}(Fr\_lh)=Fr-Fr\_uh=G[N] \quad (11)$$

Then, in step S609 of FIG. 10, the value of each of the parameters listed below that have been calculated by the processing of steps S601 through S608 explained above is checked as being its final target value.

$$\text{target front wheel braking force}(Ff)=A[N] \quad (1)$$

$$\text{target regenerative braking force}(Ff\_r)=C[N] \quad (3)$$

$$\text{target front wheel fluid pressure braking force}(Ff\_h)=D[N] \quad (5)$$

$$\text{target braking force corresponding to the front wheel upstream pressure}(Ff\_uh)=F+D[N] \quad (6)$$

$$\text{target braking force correction amount corresponding to the front wheel downstream pressure}(Ff\_lh)=-F[N] \quad (10)$$

$$\text{target rear wheel braking force}(Fr)=B[N] \quad (2)$$

$$\text{target braking force corresponding to the rear wheel upstream pressure}(Fr\_uh)=H[N] \quad (8)$$

$$\text{target braking force correction amount corresponding to the rear wheel downstream pressure}(Fr\_lh)=G[N] \quad (11)$$

In step S610, the control objects in the coordinated regenerative braking control are controlled in the following manner by the upstream brake pressure control unit 402, by the downstream brake pressure control unit 403, and by the regenerative braking control unit 206, using the respectively required ones among the parameters described above.

In step S610, the upstream brake pressure control unit 402 sets the target value for the upstream brake pressure on the basis of the value F+D+H of the total target braking force corresponding to the upstream pressure (F_uh), and controls the operation of the master cylinder 301 using this. The upstream brake pressure generated by the master cylinder 301 is controlled in this manner.

In step S610, on the basis of the value D of the target front wheel fluid pressure braking force (Ff_h) given by Equation (5), the downstream brake pressure control unit 403 sets a target value for the downstream brake pressure for the front wheel side brake actuators 302*a*, and controls the operation of the brake actuators 302*a* using this. Due to this, it is arranged for the downstream brake pressures generated by the brake actuators 302*a* to be controlled, so that the upstream brake pressure from the master cylinder 301 is reduced and the value −F of the target braking force correction amount corresponding to the front wheel downstream pressure (Ff_lh) given by Equation (10) is provided to the brake devices 113*a* on the front wheel side. Moreover, on the basis of the value B of the target rear wheel braking force (Fr) given by Equation (2), the downstream brake pressure control unit 403 sets a target value for the downstream brake pressure for the rear wheel side brake actuators 302*b*, and controls the operation of the brake actuators 302*b* using this. Due to this, it is arranged for the downstream brake pressures generated by the brake actuators 302*b* to be controlled, so that the upstream brake pressure from the master cylinder 301 is increased and the value G of the target braking force correction amount corresponding to the rear wheel downstream pressure (Fr_lh) given by Equation (11) is provided to the brake devices 113*b* on the rear wheel side.

In step S610, the regenerative braking control unit 206 outputs the value C of the target regenerative braking force (Ff_r) given by Equation (3) to the motor ECU 103. The motor ECU 103 controls the inverter 106 on the basis of this, so that the value C of the target regenerative braking force (Ff_r) is obtained from the motor 109.

After step S610 has been executed, the calculation flow chart shown in FIGS. 8, 9, and 10 terminates. The coordinated regenerative braking control according to this front and rear wheel braking force correction method is implemented by repeatedly executing this type of calculation processing at a predetermined processing cycle.

Now, the transient braking behavior when the coordinated regenerative braking control according to the front and rear wheel braking force correction method like that explained above is applied will be explained. FIG. 11 is a figure showing an example of the transient behavior when the brake pedal stepping on amount is increased, and FIG. 12 is a figure showing an example of the transient behavior when the brake pedal stepping on amount is returned.

In FIG. 11, the target front wheel braking force and the target rear wheel braking force before increase of the stepping on amount of the brake pedal are shown as A and B respectively, and the target front wheel braking force and the target rear wheel braking force after increase of the stepping on amount are shown as A' and B' respectively. That is to say, in FIG. 11, A'>A and also B'>B. On the other hand, in FIG. 12, the target front wheel braking force and the target rear wheel braking force before return of the brake pedal stepping on amount are shown as A and B respectively, and the target front wheel braking force and the target rear wheel braking force after return of the stepping on amount are shown as A' and B' respectively. That is to say, in FIG. 12, A'<A and also B'<B.

It should be understood that, before and after the stepping amount of the brake pedal increases or returned, both the case in which, the target regenerative braking force for the motor 109 changes and the case in which it does not change should be considered. When the target regenerative braking force changes, this exerts an influence upon the distribution of target braking forces between the front wheels and the rear wheels. Thus, in the following explanation, both for when the stepping amount of the brake pedal increases and for when this stepping on amount decreases, the case in which the target regenerative braking force increases, the case in which it remains the same, and the case in which it is returned will be distinguished and explained separately.

First, the transient behavior when the brake pedal stepping on amount increases will be explained with reference to FIG. 11. Among the three figures shown on the right side in FIG. 11, the case A-1 shown at the top shows an example of the case in which the target regenerative braking force increases when the stepping on amount of the brake pedal has increased. In FIG. 11, the target regenerative braking force before the brake pedal stepping on amount increases is termed C and the target regenerative braking force after the brake pedal stepping on amount has increased is termed C', and, in this case A-1, C'>C. In this case, according to FIG. 11, it will be understood that, compared to the downstream pressure correction amounts before the stepping on amount increases, in other words compared to the target braking force correction amount corresponding to the front wheel downstream pressure −F and the target braking force correction amount corresponding to the rear wheel downstream pressure G, the absolute values of the correction amounts −F' and G' for these are both increased after the stepping on amount has increased. Accordingly, by causing brake fluid to shift via the previously described fluid pressure conduits 303 from the brake actuators 302a on the front wheel side to the brake actuators 302b on the rear wheel side, it is possible to maintain the target braking force front/rear distribution even after the brake stepping on amount has increased.

The case A-2 shown at the middle of the right side in FIG. 11 shows an example of the case in which the target regenerative braking force is kept the same when the stepping on amount of the brake pedal has increased. In this case A-2, C'=C. In this case, according to FIG. 11, it will be understood that, compared to the downstream pressure correction amounts before the stepping on amount increases, in other words compared to the target braking force correction amount corresponding to the front wheel downstream pressure −F and the target braking force correction amount corresponding to the rear wheel downstream pressure G, the correction amounts −F' and G' for these after the stepping on amount has increased do not greatly change. Accordingly it is possible to maintain the target braking force front/rear distribution even after the brake stepping on amount has increased.

The case A-3 shown at the bottom of the right side in FIG. 11 shows an example of the case in which the target regenerative braking force is diminished when the stepping on amount of the brake pedal has increased. In this case A-3, C'<C. In this case, according to FIG. 11, it will be understood that, compared to the downstream pressure correction amounts before the stepping on amount increases, in other words compared to the target braking force correction amount corresponding to the front wheel downstream pressure −F and the target braking force correction amount corresponding to the rear wheel downstream pressure G, the absolute values of the correction amounts −F' and G' for these after the stepping on amount has increased both decrease. Accordingly, by brake fluid returning via the previously described fluid pressure conduits 303 from the brake actuators 302b on the rear wheel side to the brake actuators 302a on the front wheel side, it is possible to maintain the target braking force front/rear distribution even after the brake stepping on amount has increased.

Next, the transient behavior when the brake pedal stepping on amount is returned will be explained with reference to FIG. 12. Among the three figures shown on the right side in FIG. 12, the case B-1 shown at the top shows an example of the case in which the target regenerative braking force increases when the stepping on amount of the brake pedal has returned. In FIG. 12, the target regenerative braking force before the brake pedal stepping on amount returns is termed C and the target regenerative braking force after the brake pedal stepping on amount has returned is termed C', and, in this case B-1, C'>C. In this case, according to FIG. 12, it will be understood that, in a similar manner to the case A-1 of FIG. 11, compared to the downstream pressure correction amounts before the stepping on amount returns, in other words compared to the target braking force correction amount corresponding to the front wheel downstream pressure −F and the target braking force correction amount corresponding to the rear wheel downstream pressure G, the absolute values of the correction amounts −F' and G' for these are both increased after the stepping on amount has returned. Accordingly, by causing brake fluid to shift via the previously described fluid pressure conduits 303 from the brake actuators 302a on the front wheel side to the brake actuators 302b on the rear wheel side, it is possible to maintain the target braking force front/rear distribution even after the brake stepping on amount has increased.

The case B-2 shown at the middle of the right side in FIG. 12 shows an example of the case in which the target regenerative braking force is kept the same when the stepping on amount of the brake pedal has returned. In this case B-2, C'≈C. In this case, according to FIG. 12, it will be understood that, in a similar manner to the case A-2 of FIG. 11, compared to the downstream pressure correction amounts before the stepping on amount returns, in other words compared to the target braking force correction amount corresponding to the front wheel downstream pressure −F and the target braking force correction amount corresponding to the rear wheel downstream pressure G, the correction amounts −F' and G' for these after the stepping on amount has returned do not greatly change. Accordingly it is possible to maintain the target braking force front/rear distribution even after the brake stepping on amount has returned.

And the case B-3 shown at the bottom of the right side in FIG. 12 shows an example of the case in which the target regenerative braking force is diminished when the stepping on amount of the brake pedal has returned. In this case B-3, C'<C. In this case, according to FIG. 12, it will be understood that, in a similar manner to the case A-3 of FIG. 11, compared to the downstream pressure correction amounts before the stepping on amount returns, in other words compared to the target braking force correction amount corresponding to the front wheel downstream pressure –F and the target braking force correction amount corresponding to the front wheel downstream pressure G, the absolute values of the correction amounts –F' and G' for these after the stepping on amount has returned both decrease. Accordingly, by brake fluid returning via the previously described fluid pressure conduits 303 from the brake actuators 302*b* on the rear wheel side to the brake actuators 302*a* on the front wheel side, it is possible to maintain the target braking force front/rear distribution even after the brake stepping on amount has returned.

As has been explained above, during this transient behavior, both when the stepping on amount of the brake pedal increases and when this stepping on amount is returned, it is possible to maintain the target braking force front/rear distribution by shifting brake fluid, according to requirements, between the brake actuators 302*a* for the front wheel side and the brake actuators 302*b* for the rear wheel side.

Figure 13:
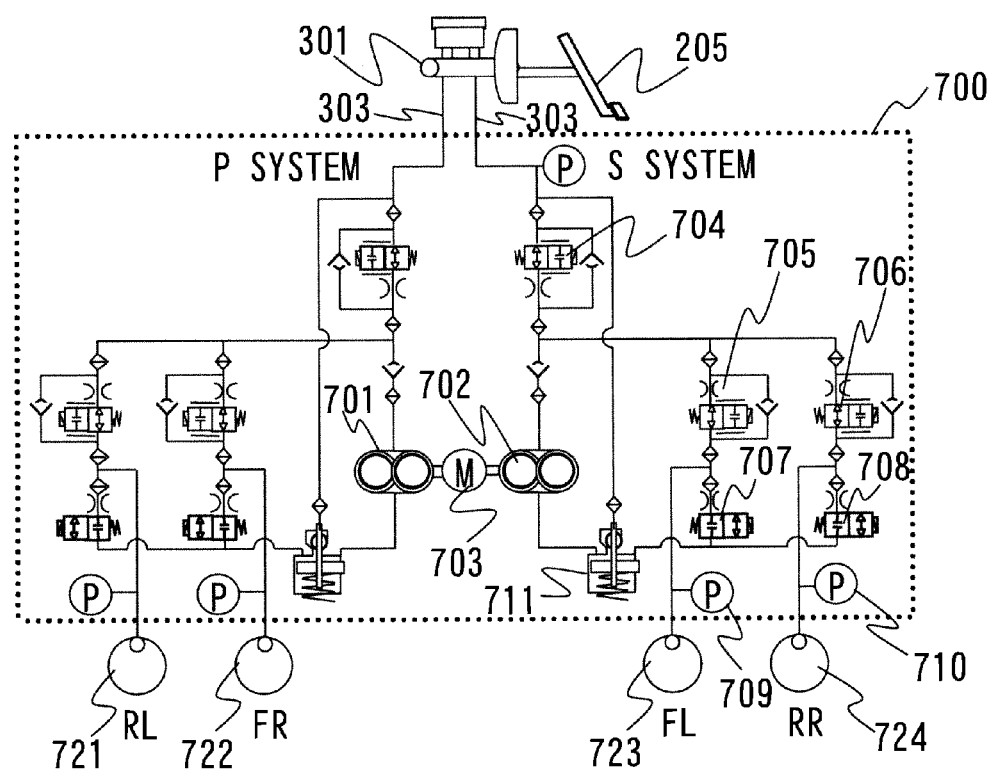
FIG. 13 is a conduit diagram for the brake system.

Next, a brake system to which the brake control device according to the present invention has been applied will be explained. FIG. 13 is a conduit diagram for a brake system 700 that is an example of a brake system to which the brake control device according to the present invention has been applied. In this brake system 700, fluid pressure conduits 303 are connected between a master cylinder 301 shown in FIG. 3 given above and wheel cylinders 721 through 724. It should be understood that the wheel cylinder 721 is housed within the brake device 113*b* corresponding to the left side rear wheel, the wheel cylinder 722 is housed within the brake device 113*a* corresponding to the right side front wheel, the wheel cylinder 723 is housed within the brake device 113*a* corresponding to the left side front wheel, and the wheel cylinder 724 is housed within the brake device 113*b* corresponding to the right side rear wheel.

The brake system 700 includes two systems: a P system that corresponds to the wheel cylinders 721 and 722, and an S system that corresponds to the wheel cylinders 723 and 724. Respective pumps 701 and 702 are provided to the P system and the S system. The pump 701 and the pump 702 are driven by a common motor 703.

Moreover, both the P system and the S system are provided with valves of various types and a reservoir tank, and these are mutually connected together via flow conduits consisting of fluid pressure conduits 303. As described previously, these fluid pressure conduits 303 have an X type conduit structure, and in the P system the wheel cylinder 721 and the wheel cylinder 722 are mutually connected together, while in the S system the wheel cylinder 723 and the wheel cylinder 724 are mutually connected together.

In this brake system 700, the P system and the S system have mutually symmetrical structures, and their operations are almost the same. Accordingly, only the S system will be described in the following explanation.

In the S system, a flow conduit from the master cylinder 301 initially branches into two. One of the branched off flow conduits is connected to a gate valve 704, while the other is connected to the intake side of the pump 702 via a reservoir tank 711. A flow conduit from the outlet side of the gate valve 704 and a flow conduit from the discharge side of the pump 702, after coming together, are connected to the inlet sides of pressure increase valves 705 and 706 that are provided to the wheel cylinders 723 and 724 respectively. It should be understood that, for example, normally open type solenoid valves may be used for the gate valve 704 and the pressure increase valves 705 and 706.

The flow conduit from the outlet side of each of the pressure increase valves 705 and 706 branches into two. One of these branched off flow conduits is connected to the respective wheel cylinder 723 or 724, while the other is connected to a respective pressure reduction valve 707 or 708. Hydraulic pressure sensors 709 and 710 are installed in the flow conduits between this branch point and the wheel cylinders 723 and 724 respectively. Flow conduits from the outlet sides of the pressure reduction valves 707 and 708 are connected to the reservoir tank 711 after coming together. It should be understood that, for example, normally closed type solenoid valves may be used for the pressure reduction valves 707 and 708.

It should be understood that the pump 702, the gate valve 704, the pressure increase valves 705 and 706, and the pressure reduction valves 707 and 708 of the S system described above are components that correspond to the brake actuator 302*a* corresponding to the left side front wheel and to the brake actuator 302*b* corresponding to the right side rear wheel in FIG. 3. In a similar manner, the pump 701 and the valves of the P system are components that correspond to the brake actuator 302*a* corresponding to the right side front wheel and to the brake actuator 302*b* corresponding to the left side rear wheel in FIG. 3.

Next, the operation of this brake system 700 during coordinated regenerative braking control will be explained with reference to FIGS. 14 through 17.

Figure 14:
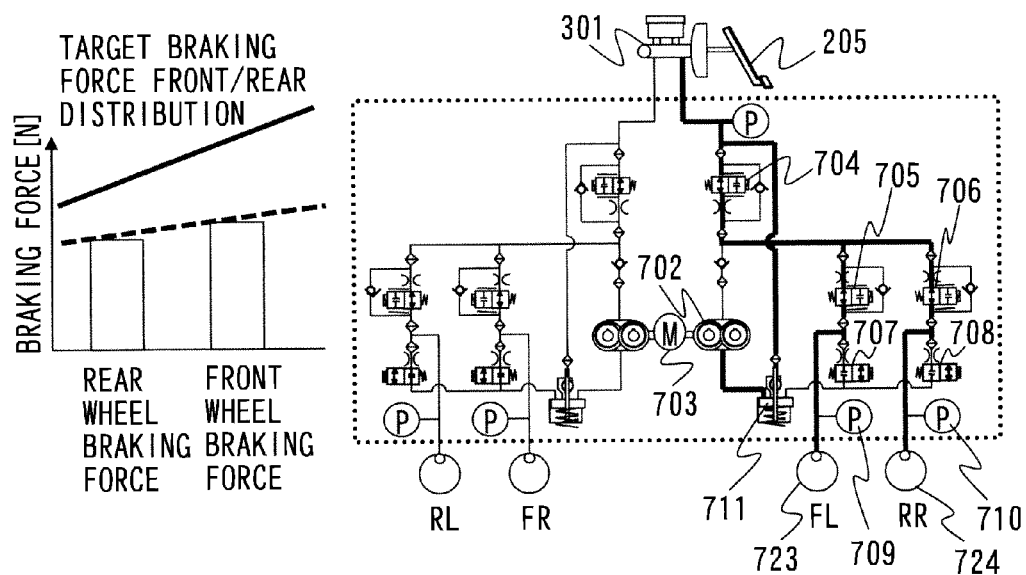
FIG. 14 is a figure showing the operation of the brake system in its initial state.

FIG. 14 is a figure showing the operation of the brake system 700 in its initial state. In the brake system 700, the initial states of the valves and the pump 702 are respectively as follows:

gate valve 704: open
pressure increase valves 705, 706: open
pressure reduction valves 707, 708: closed
pump 702: non-driven When, in the initial state shown in FIG. 14, the upstream brake pressure from the master cylinder 301 is supplied, hydraulic pressure equivalent to this upstream brake pressure is supplied via the gate valve 704 (which is open) and the pressure increase valves 705 and 706 (which are open) to the wheel cylinders 723 and 724 respectively. At the same time, hydraulic pressure equivalent to the upstream brake pressure is also supplied via the reservoir tank 711 to the intake side of the pump 702.

Figure 15:
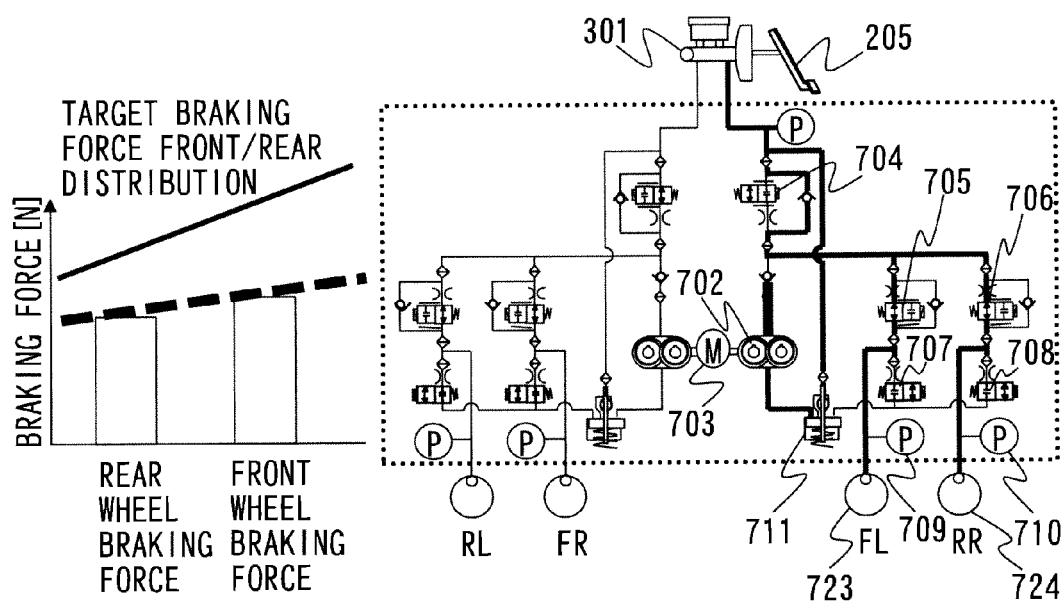
FIG. 15 is a figure showing the operation of the brake system when the pressure has been raised by a pump.

FIG. 15 is a figure showing the operation of the brake system 700 when, from the initial state of FIG. 14, the pressure has been raised by the pump 702. At this time, the states of the gate valve 704 and the pump 702 are changed as described below.

gate valve 704: open→closed
pump 702: non-driven→driven

By closing the gate valve 704 and driving the pump 702 as described above, the hydraulic pressure at the discharge side of the pump 702 is raised.

Figure 16:
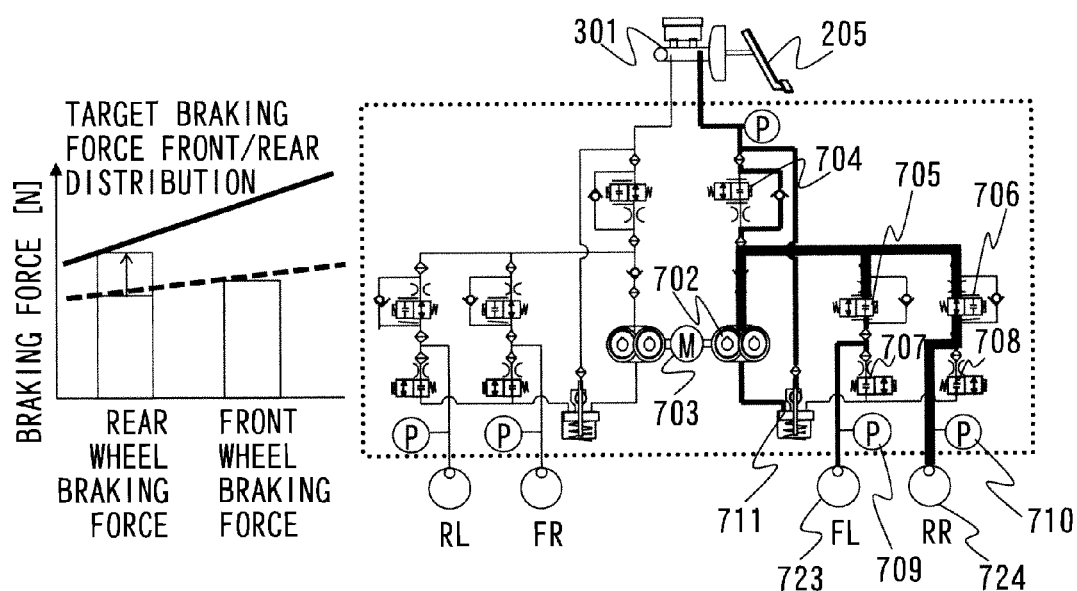
FIG. 16 is a figure showing the operation of the brake system when the pressure of the brake fluid to the wheel cylinder on the right rear wheel side has been raised.

FIG. 16 is a figure showing the operation of the brake system 700 when, from the state shown in FIG. 15, the pressure of the brake fluid to the wheel cylinder 724 on the right rear wheel side has been raised. At this time, the state of the pressure increase valve 705 is changed as shown below, while the state of the pressure increase valve 706 is maintained as shown below.

pressure increase valve 705: open→closed
pressure increase valve 706: kept open By closing the pressure increase valve 705 and keeping the pressure increase valve 706 open as described above, brake fluid whose pressure has been raised by the pump 702 is outputted to the wheel cylinder 724 on the right rear wheel side.

Figure 17:
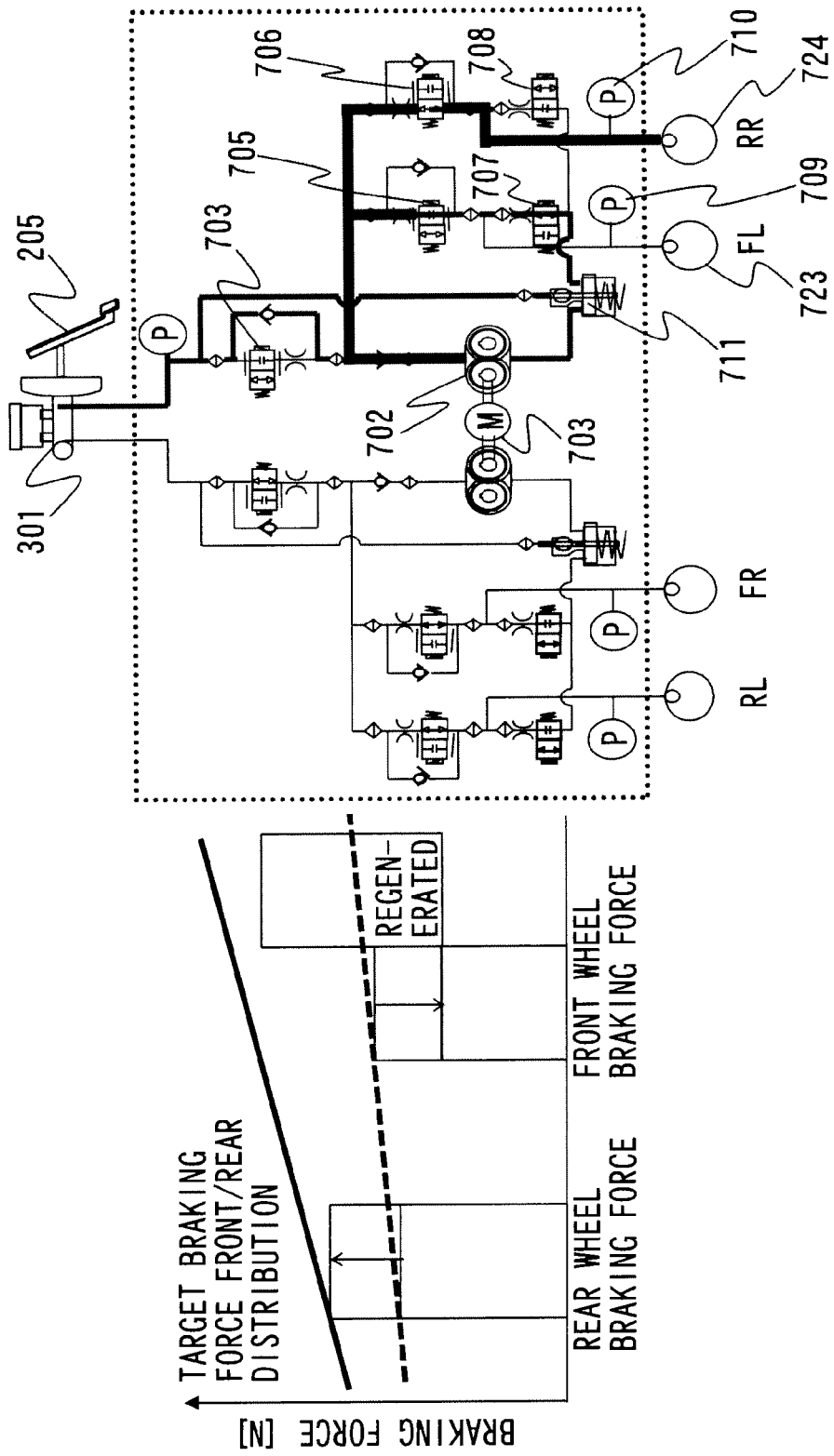
FIG. 17 is a figure showing the operation of the brake system when the pressure of the brake fluid to the wheel cylinder on the left front wheel side has been reduced.

FIG. 17 is a figure showing the operation of the brake system 700 when the pressure of the brake fluid to the wheel cylinder 723 on the left front side is reduced from the state shown in FIG. 16. At this time, the state of the pressure reduction valve 707 is changed as follows:

pressure reduction valve 707: closed→open

By opening the pressure reduction valve 707 as described above, a portion of the brake fluid whose pressure has been raised by the pump 702 is returned to the intake side of the pump 702 via the reservoir tank 711. Due to this, the pressure of the brake fluid that is outputted to the wheel cylinder 723 at the left front wheel side is reduced.

It should be understood that the pressure reduction amount for the wheel cylinder 723 on the left front wheel side and the pressure increase amount for the wheel cylinder 724 on the right rear wheel side can be controlled on the basis of the values detected by the hydraulic pressure sensors 709 and 710. For example, the duty ratios of the valves and/or the output of the pump 702 may be adjusted on the basis of the difference between the target braking force for the wheel cylinder 723 (i.e. the target front wheel fluid pressure braking force) and the target braking force for the wheel cylinder 724 (i.e. the target rear wheel fluid pressure braking force), and the actual braking forces estimated from the values detected by the hydraulic pressure sensors 709 and 710, and feedback control may be performed so as to make these target braking forces and the actual braking forces agree with one another. Control of the downstream brake pressures is performed in this manner.

Moreover, as previously described, the upstream brake pressure from the master cylinder 301 is adjusted so that the brake fluid decrease amount corresponding to the pressure reduction amount for the wheel cylinder 723 on the left front wheel side and the brake fluid increase amount corresponding to the pressure increase amount for the wheel cylinder 724 on the right rear wheel side become almost equal to one another. Accordingly, the amounts of gain and loss of brake fluid between the front wheel and the rear wheel approximately agree with one another, so that increase in the size of the reservoir tank 711 and so on becomes unnecessary.

It should be understood that the structure and operation of the brake system 700 explained above are only given by way of example; the brake system to which a brake control device according to the present invention is applied is not to be considered as being limited thereby. Any structure and any operation of the brake system may be employed as appropriate, provided that they are capable of implementing the coordinated regenerative braking control according to the front and rear wheel braking force correction method as previously described.

According to the first embodiment of the present invention explained above, the following beneficial operational effects are obtained.

(1) The brake ECU 102 that serves as the brake control device according to the present invention is mounted to the vehicle 100. The vehicle 100 comprises: a plurality of brake devices 113a and 113b that are provided respectively to correspond to a pair of front wheels 112a which are driving wheels and to a pair of rear wheels 112b which are non-driving wheels, and that supply braking force to those wheels due to brake pressures; a master cylinder 301 that generates a common upstream brake pressure for the brake devices 113a and 113b; brake actuators 302a and 302b that, on the basis of this upstream brake pressure, generate individual downstream brake pressures for the brake devices 113a and 113b; and a motor 109 that performs regenerative braking for the front wheels 112a. During regenerative braking by the motor 109, by performing coordinated regenerative braking control according to a front and rear wheel braking force correction method like that shown in FIG. 6, the brake ECU 102 controls the upstream brake pressure and the downstream brake pressures so as to reduce the downstream brake pressures for the brake devices 113a corresponding to the front wheels 112a to lower than the upstream brake pressure, and also so as to increase the downstream brake pressures for the brake devices 113b corresponding to the rear wheels 112b to higher than the upstream brake pressure. Since these arrangements are provided, accordingly it is possible to implement coordinated regeneration control that exhibits a high braking performance.

(2) The master cylinder 301 supplies brake fluid to the brake devices 113a and 113b in flow amounts that correspond to the upstream brake pressure. The brake actuators 302a supply the brake fluid supplied from the master cylinder 301 to the brake devices 113a that correspond to the front wheels 112a while reducing it by reduction amounts that correspond to their downstream brake pressures. On the other hand, the brake actuators 302b supply the brake fluid supplied from the master cylinder 301 to the brake devices 113b that correspond to the rear wheels 112b while increasing it by increase amounts that correspond to their downstream brake pressures. And the brake ECU 102 controls the upstream brake pressure and the downstream brake pressures so that the difference between the reduction of the amount of brake fluid to the brake devices 113a that correspond to the front wheels 112a and the increase of the amount of brake fluid to the brake devices 113b that correspond to the rear wheels 112b is kept within a predetermined range. Since this arrangement is adopted, accordingly it is possible to make the reservoir tank 711 that is mounted to the vehicle 100 more compact.

(3) The brake ECU 102 comprises the target braking force calculation unit 501, the target braking force distribution calculation unit 502, the target fluid pressure braking force calculation unit 503, the target upstream pressure braking force calculation unit 504, the upstream brake pressure control unit 402, and the downstream brake pressure control unit 403. The target braking force calculation unit 501 calculates the target braking force (step S601). The target braking force distribution calculation unit 502 distributes this target braking force between the front wheels 112a which are the driving wheels and the rear wheels 112b which are the non-driving wheels (step S602), and calculates the target front wheel braking force (Ff) and the target rear wheel braking force (Fr) (step S603). The target fluid pressure braking force calculation unit 503 acquires the target regenerative braking force (Ff_r) for the front wheels 112a from the regenerative braking control unit 206, and calculates the target front wheel fluid pressure braking force (Ff_h) on the basis of the target front wheel braking force (H) and the target regenerative braking force (Ff_r) that has been acquired (step S605). The target upstream pressure braking force calculation unit 504 calculates the total target braking force corresponding to the upstream pressure (F_uh) corresponding to the target value of the upstream brake pressure, on the basis of the target front wheel fluid pressure braking force (Ff_h) and the target rear wheel braking force (Fr) (steps S606 and S607). The upstream brake pressure control unit 402 controls the upstream brake pressure on the basis of the total target braking force corresponding to the upstream pressure (F_uh). And the downstream brake pressure control unit 403 controls the downstream brake pressures to the brake devices 113a corresponding to the front wheels 112a on the basis of the target front wheel fluid pressure braking force (Ff_h), and also controls the downstream brake pressures to the brake devices 113b corresponding to the rear wheels 112b on the basis of the target rear wheel braking force (Fr). Since this arrangement is adopted, accordingly it is possible to control the upstream brake pressure from the master cylinder 301 and the downstream brake pressures from the brake actuators 302a and 302b in an appropriate manner.

(4) The vehicle 100 includes the fluid pressure conduits 303 of the X conduit type that are disposed between the brake devices 113a corresponding to the front wheels 112a, which are the driving wheels, and the brake devices 113b corresponding to the rear wheels 112b, which are the non-driving wheels. And the brake ECU 102 controls the brake actuators 302a and 302b so as to make brake fluid shift via the fluid pressure conduits 303 between the brake devices 113a and the brake devices 113b. In other words, as the brake system 700, the vehicle 100 is provided with the fluid pressure conduits 303 of the P system and of the S system, and with the pressure reduction valve 707 (in the S system) and the pressure reduction valve in the P system corresponding thereto that are respectively provided to the fluid pressure conduits 303 of the P system and of the S system. The fluid pressure conduit 303 of the P system is provided between the wheel cylinder 722 of the brake device 113a that corresponds to the front wheel 112a on the right side and the wheel cylinder 721 of the brake device 113b that corresponds to the rear wheel 112b on the left side, while the fluid pressure conduit 303 of the S system is provided between the wheel cylinder 723 of the brake device 113a that corresponds to the front wheel 112a on the left side and the wheel cylinder 724 of the brake device 113b that corresponds to the rear wheel 112b on the right side. During regenerative braking by the motor 109, these pressure reduction valves are opened, and, along with brake fluid flowing from the wheel cylinder 722 into the wheel cylinder 721 via the fluid pressure conduit 303 of the P system, also brake fluid flows from the wheel cylinder 723 into the wheel cylinder 724 via the fluid pressure conduit 303 of the S system. Since this arrangement is adopted, therefore it is possible to implement brake operation according to this coordinated regenerative braking control according to a front and rear wheel braking force correction method for the vehicle 100.

Embodiment #2

Next, a second embodiment of the present invention will be explained. In the first embodiment described above, the brake ECU 102 determines the distribution of target braking force to the front wheels and to the rear wheels on the basis of a predetermined ideal front/rear braking force distribution line, while giving emphasis to vehicle stability. By contrast, in the second embodiment that will be explained below, it is made possible, not only to calculate the distribution of target braking force while giving emphasis to vehicle stability as in the first embodiment, but also to calculate the distribution of target braking force while giving emphasis to regeneration of energy, and it is made possible to employ one or the other of these methods of distribution, according to circumstances.

Figure 18:
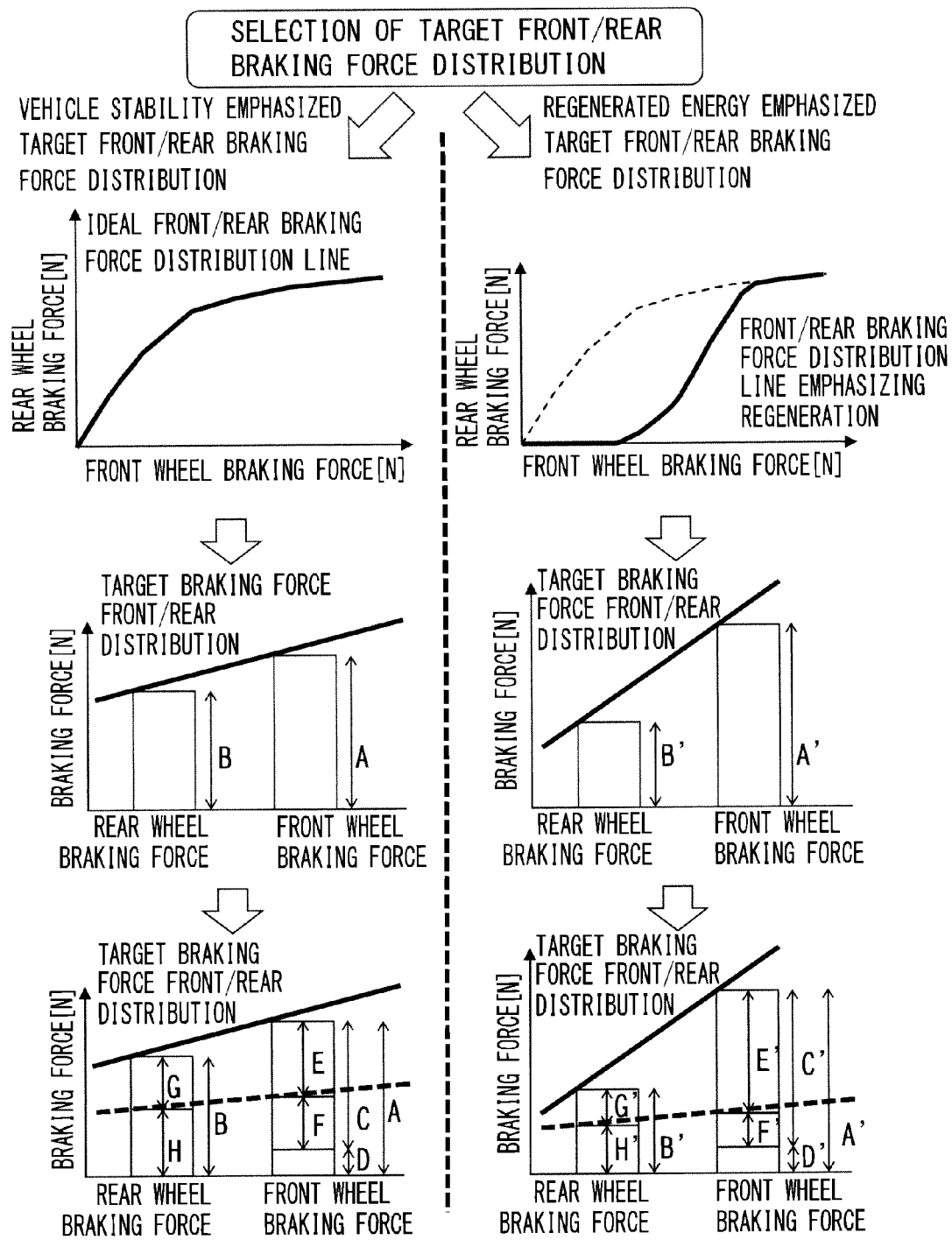
FIG. 18 is a figure showing a summary of coordinated regenerative braking control according to a second embodiment.

FIG. 18 is a figure showing a summary of the coordinated regenerative braking control according to this second embodiment. In this embodiment, first, one or the other of the two types of target braking force distribution above is selected, in other words, either a target front/rear braking force distribution that gives emphasis to vehicle stability, or a target front/rear braking force distribution that gives emphasis to energy regeneration, is selected. This selection may, for example, be performed by forecasting the stability of the vehicle 100 during braking, and by performing the following procedure on the basis of the result of this forecast.

The target front/rear braking force distribution that gives emphasis to vehicle stability is one that is determined on the basis of the ideal front/rear braking force distribution line that, as previously described, gives emphasis to stability of the vehicle. Due to this, when the vehicle 100 is braked, no negative influence is exerted upon the behavior of the vehicle 100, so that it is possible to brake the vehicle 100 in a stable manner. On the other hand, with the target front/rear braking force distribution that gives emphasis to energy regeneration, enhancement of the regeneration of energy during braking is considered to be a very important goal from the point of view of energy saving traveling, so that allocation of braking to the front wheels 112a, i.e. to the driving wheels, is made as great as possible. However, in a case in which an excessive amount of braking force is allocated in this manner to the driving wheels, if for example the frictional coefficient of the road surface is low or during braking on a curve or the like, or if the stability of the vehicle 100 during braking is comparatively low, then there is a danger of a negative influence being exerted upon the behavior of the vehicle 100, such as generation of vehicle wheel locking, understeering, oversteering, or the like.

Thus, in this embodiment, before braking starts, the stability of the vehicle 100 during braking is forecast. If the result is that the stability of the vehicle 100 will be low, then, as shown on the left side of FIG. 18, the target front/rear braking force distribution that gives emphasis to vehicle stability is selected. In this case, the target front wheel braking force and the target rear wheel braking force are determined by distributing the target braking force on the basis of the predetermined ideal front/rear braking force distribution line, according to a method like that explained in connection with the first embodiment. And coordinated regenerative braking control is performed by the front and rear wheel braking force correction method.

On the other hand, if it is forecast that during braking the stability of the vehicle 100 will be high, then, as shown on the right side of FIG. 18, the target front/rear braking force distribution that gives emphasis to energy regeneration is selected. In this case, the target front wheel braking force and the target rear wheel braking force are determined by distributing the target braking force on the basis of a front/rear braking force distribution line that gives emphasis to regeneration, like the one shown in the figure. This front/rear braking force distribution line that gives emphasis to regeneration is different from the ideal front/rear braking force distribution line previously described, and with it the braking force allocation to the front wheel side is set to be larger, so that the greatest possible amount of regenerated energy is available from the front wheel side, which is the driving wheel side. After target front wheel braking force and the target rear wheel braking force have been determined in this manner, coordinated regenerative braking control is performed by a front and rear wheel braking force correction method, by performing control similar to that explained in connection with the first embodiment.

However, even if it has been forecast that the stability of the vehicle 100 during braking will be high, if the necessity for regenerative braking is low, as for example when the battery 107 is in the fully charged state or the like, then it is desirable that the target front/rear braking force distribution that gives emphasis to energy regeneration should not be selected. By doing this it is possible to perform selection of a more appropriate target braking force allocation, according to the necessity for performing regenerative braking.

The stability of the vehicle 100 during braking can be forecast on the basis of the state of brake actuation by the driver of the vehicle 100 and the state of steering actuation, the state of the road surface over which the vehicle 100 is traveling, the speed of the vehicle 100 and its horizontal acceleration, and so on. The stability of the vehicle during braking is forecast by the brake ECU 102 acquiring this information from the vehicle 100 as the previously described vehicle state signals. For example, the brake actuation state can be acquired from the brake pedal signal, the steering actuation state can be acquired from the steering angle signal, and the speed can be acquired from the vehicle speed signal. By estimating the coefficient of friction µ of the road surface by detecting the rotational states of the wheels of the vehicle 100 and so on, by detecting the acceleration in the horizontal direction with an acceleration sensor mounted to the vehicle 100, and by outputting this information as the vehicle state signals, it is possible for the brake ECU 102 to acquire the state of the road surface over which the vehicle 100 is traveling and the horizontal acceleration of the vehicle 100. If for example the vehicle 100 is traveling in a straight line upon a road surface that has a high coefficient of friction µ, then it is possible to forecast from this information that the stability of the vehicle 100 will be high.

It should be understood that there is no need for all of the information described above to be employed for forecasting the stability of the vehicle 100 during braking. It is possible to forecast the stability of the vehicle 100 during braking on the basis of at least one item of information, among the above information, that can be acquired by the brake ECU 102. Moreover, it would also be acceptable to arrange for the stability of the vehicle 100 during braking not to be forecast by the brake ECU 102, but to be forecast by some other unit, for example by the integrated ECU 101 or the like, and for the result of this forecast to be outputted to the brake ECU 102.

FIG. 19 is a figure showing a flow chart for processing for selecting between target braking force distributions like those explained above. The processing of this flow chart is executed by the target braking force distribution calculation unit 502 of FIG. 7 in the brake ECU 102, before the processing of step S602 of FIG. 8.

In step S801, items of information of various types are inputted as decision factors, for example brake stepping on force, speed, battery SOC, whether or not ABS action is being performed, and so on, and a decision is made as to whether or not to permit the execution of coordinated regenerative braking on the basis of this information. If the result is that execution of coordinated regenerative braking is permitted, then the flow of control proceeds to step S802, whereas if it is not permitted then the flow of control is transferred to step S804.

In step S802, the stability of the vehicle 100 during braking is forecast. Here, as previously described, items of information of various types are inputted as decision factors, and the vehicle stability is forecast on the basis of this information. If the result is that the vehicle stability is forecast to be satisfactory, then the flow of control proceeds to step S803, whereas if the vehicle stability is forecast to be poor then the flow of control is transferred to step S804.

In step S803, items of information of various types are inputted as decision factors, for example an energy saving mode signal, battery SOC, information about the distance to the destination and/or to a charging station, and so on, and the necessity of increasing the regeneration amount for energy saving traveling is determined on the basis of this information. If the result is that it is not necessary to increase the regeneration amount, then the flow of control proceeds to step S804, whereas if it is necessary then the flow of control is transferred to step S805.

In step S804, the target front/rear braking force distribution that gives emphasis to vehicle stability is selected.

In step S805, the target front/rear braking force distribution that gives emphasis to energy regeneration is selected.

After step S804 or step S805 has been executed, the processing shown in the flow chart of FIG. 19 terminates, and the processing of step S602 of FIG. 8 and subsequent steps is executed using the target front/rear braking force distribution that has been selected.

In this embodiment, by applying control logic like that explained above, it is possible to implement coordinated regenerative braking control in which the stability of the vehicle during braking is excellent, and moreover the energy efficiency is excellent.

It should be understood that, in the flow chart of FIG. 19, it is not necessary to perform the decision processing of all of steps S801, S802, and S803; any of these could be omitted. By performing at least one of these decision processing steps, it is possible to select the optimum one of the target front/rear braking force distribution that emphasizes vehicle stability, and the target front/rear braking force distribution that emphasizes energy regeneration, and to determine the target braking force allocation between the front wheels and the rear wheels using the selected distribution. As a result, it is possible to change the target braking force allocation between the front wheels and the rear wheels according to the prevailing circumstances.

According to the second embodiment of the present invention explained above, in addition to the beneficial operational effects (1) through (4) explained in connection with the first embodiment, the following further beneficial operational effects are obtained.

(5) The target braking force distribution calculation unit 502 forecasts the stability of the vehicle 100 during braking (step S802), and, on the basis of the result of this forecast, changes the distribution of the target braking force between the front wheels 112a, which are the driving wheels, and the rear wheels 112b, which are the non-driving wheels (steps S804 and S805). In other words, if it is forecast that the stability of the vehicle 100 during braking will be low, then in step S804 the target front/rear braking force distribution that gives emphasis to vehicle stability that has been set in advance to emphasize the stability of the vehicle 100 is selected. And, in step S602 of FIG. 8, the target braking force is distributed between the front wheels 112a and the rear wheels 112b according to this distribution. Moreover, if it is forecast that the stability of the vehicle 100 during braking will be high, then in step S805 the target front/rear braking force distribution that gives emphasis to energy regeneration that has been set in advance to emphasize retrieval of energy during regenerative braking is selected. And, in step S602 of FIG. 8, the target braking force is distributed between the front wheels 112a and the rear wheels 112b according to this distribution. Since these arrangements are adopted, accordingly it is possible to perform the optimum coordinated regenerative braking control, according to the prevailing circumstances.

(6) In step S802, the target braking force distribution calculation unit 502 forecasts the stability of the vehicle 100 during braking on the basis of at least one of the state of brake actuation and the state of steering actuation by the driver of the vehicle 100, the state of the road surface over which the vehicle 100 is traveling, and the speed and the acceleration of the vehicle 100. Due to this, it is possible to forecast the stability of the vehicle 100 during braking at high accuracy.

(7) By the target braking force distribution calculation unit 502 determining upon the necessity of regenerative braking of the vehicle 100 (in step S803) and executing the processing of step S804 or step S805 on the basis of the result of this forecast, it is arranged to change the distribution of the target braking force between the front wheels 112a, which are the driving wheels, and the rear wheels 112b, which are the non-driving wheels. Due to this, it is possible to perform coordinated regenerative braking control according to the necessity for regenerative braking, and moreover in an appropriate manner.

It should be understood that, in the first and second embodiments explained above, examples were explained in which the vehicle 100 that was taken as the subject was an electrically propelled vehicle of the FF type (front motor—front drive type), which is the most common drive format. However, the application of the present invention is not to be considered as being limited to a vehicle of the FF type; the present invention could also be applied to other drive formats, for example to a FR type (front motor—rear drive type) vehicle or to a 4WD type vehicle.

The embodiments and variant embodiments explained above are only examples; the present invention is not to be considered as being limited by the details thereof, provided that the essential characteristics of the present invention are adhered to.

While various embodiments and variant embodiments have been explained in the above description, the present invention is not to be considered as being limited by the details thereof. Other implementations that are considered to be within the scope of the technical concept of the present invention are also included within its range.

The content of the disclosure of the following application, upon which priority is claimed, is hereby incorporated herein by reference:

Japanese Patent Application No. 2012-104778 (filed on 1 May 2012).

REFERENCE SIGNS LIST

100: vehicle
101: integrated ECU
102: brake ECU
109: motor
113a, 113b: brake devices
301: master cylinder
302a, 302b: brake actuators
303: fluid pressure conduit
401: coordinated regenerative braking control unit
402: upstream brake pressure control unit
403: downstream brake pressure control unit
501: target braking force calculation unit
502: target braking force distribution calculation unit
503: target fluid pressure braking force calculation unit
504: target upstream pressure braking force calculation unit
505: target downstream pressure braking force calculation unit

The invention claimed is:

1. A brake control device mounted to a vehicle that comprises a pair of driving wheels and a pair of non-driving wheels, wherein the vehicle comprises:
 a plurality of brake devices, one provided to correspond to each one of the driving wheels and the non-driving wheels, that provide braking forces to the wheels due to brake fluid pressures;
 a master cylinder that generates a common upstream brake pressure for the plurality of brake devices:
 brake actuators that generate individual downstream brake pressures for the plurality of brake devices on the basis of the upstream brake pressure; and
 a regenerative braking unit that performs regenerative braking for the driving wheels;
 wherein the brake control device controls the upstream brake pressure and the downstream brake pressures so that, during regenerative braking by the regenerative braking unit, the downstream brake pressures to the plurality of brake devices corresponding to the driving wheels are reduced to be lower than the upstream brake pressure, and the downstream brake pressures to the plurality of brake devices corresponding to the non-driving wheels are increased to be higher than the upstream brake pressure.

2. A brake control device according to claim 1, wherein:
 the master cylinder supplies brake fluid to the plurality of brake devices in a flow amount corresponding to the upstream brake pressure;
 the brake actuators supply brake fluid supplied from the master cylinder to the brake devices corresponding to the driving wheels while decreasing the amount thereof by a decrease amount that corresponds to the downstream brake pressure, and supply brake fluid supplied from the master cylinder to the brake devices corresponding to the non-driving wheels while increasing the amount thereof by an increase amount that corresponds to the downstream brake pressure; and
 the brake control device controls the upstream brake pressure and the downstream brake pressures so that the difference between the decrease amount of brake fluid supplied to the brake devices that correspond to the driving wheels, and the increase amount of brake fluid supplied to the brake devices that correspond to the non-driving wheels, is within a predetermined range.

3. A brake control device according to claim 1, comprising:
 a target braking force calculation unit that calculates a target braking force;
 a target braking force distribution calculation unit that distributes the target braking force to the driving wheels and the non-driving wheels, and that calculates a target braking force for the driving wheels and a target braking force for the non-driving wheels;
 a target fluid pressure braking force calculation unit that acquires a target regenerative braking force for the driving wheels, and that calculates a target fluid pressure braking force for the driving wheels on the basis of the target braking force for the driving wheels and the target regenerative braking force that has been acquired;

a target upstream pressure braking force calculation unit that calculates a target braking force corresponding to the upstream pressure, which corresponds to the target value for the upstream brake pressure, on the basis of the target fluid pressure braking force and the target braking force for the non-driving wheels;

an upstream brake pressure control unit that controls the upstream brake pressure on the basis of the target braking force corresponding to the upstream pressure; and a downstream brake pressure control unit that controls the downstream brake pressures of the brake devices corresponding to the driving wheels on the basis of the target fluid pressure braking force for the driving wheels, and also controls the downstream brake pressures of the brake devices corresponding to the non-driving wheels on the basis of the target braking force for the non-driving wheels.

4. A brake control device according to claim 3, wherein the target braking force distribution calculation unit forecasts the stability of the vehicle during braking, and changes the distribution of the target braking force to the driving wheels and to the non-driving wheels on the basis of the result of that forecast.

5. A brake control device according to claim 4, wherein, when the stability of the vehicle during braking is forecast to be low, the target braking force distribution calculation unit distributes the target braking force to the driving wheels and to the non-driving wheels according to a distribution set in advance that gives emphasis to stability of the vehicle.

6. A brake control device according to claim 4, wherein, when the stability of the vehicle during braking is forecast to be high, the target braking force distribution calculation unit distributes the target braking force to the driving wheels and to the non-driving wheels according to a distribution set in advance that gives emphasis to retrieval of energy during regenerative braking.

7. A brake control device according to claim 4, wherein the target braking force distribution calculation unit forecasts the stability of the vehicle during braking on the basis of at least one of the state of brake actuation and the state of steering actuation by the driver of the vehicle, the state of the road surface over which the vehicle is traveling, and the speed and the acceleration of the vehicle.

8. A brake control device according to claim 3, wherein the target braking force distribution calculation unit decides upon the necessity of regenerative braking of the vehicle, and changes the distribution of the target braking force to the driving wheels and to the non-driving wheels on the basis of the result of this decision.

9. A brake control device according to claim 1, wherein:
the vehicle comprises a conduit that is disposed between
a brake device corresponding to the driving wheel and
a brake device corresponding to the non-driving wheel; and
the brake control device controls the brake actuators so that brake fluid shifts via the conduit between the brake device corresponding to the driving wheel and the brake device corresponding to the non-driving wheel.

10. A brake control method for a vehicle that comprises a pair of driving wheels and a pair of non-driving wheels, wherein the vehicle comprises:
a plurality of brake devices, one provided to correspond to each one of the driving wheels and the non-driving wheels, that provide braking forces to the wheels due to brake fluid pressures;
a master cylinder that generates a common upstream brake pressure for the plurality of brake devices;
brake actuators that generate individual downstream brake pressures for the plurality of brake devices on the basis of the upstream brake pressure;
a regenerative braking unit that performs regenerative braking for the driving wheels; and
a brake control device that controls the upstream brake pressure and the downstream brake pressures;
wherein, during regenerative braking by the regenerative braking unit, the upstream brake pressure and the downstream brake pressures are controlled by the brake control device, so that the downstream brake pressures to the plurality of brake devices corresponding to the driving wheels are reduced to be lower than the upstream brake pressure, and the downstream brake pressures to the plurality of brake devices corresponding to the non-driving wheels are increased to be higher than the upstream brake pressure.

11. A brake control method according to claim 10, wherein the vehicle further comprises:
a first conduit system that is provided between a brake device corresponding to a right side driving wheel and a brake device corresponding to a left side non-driving wheel;
a second conduit system that is provided between a brake device corresponding to a left side driving wheel and a brake device corresponding to a right side non-driving wheel; and
control valves provided for each of the first conduit system and the second conduit system;
wherein, during regenerative braking by the regenerative braking unit, the control valves are opened, so that brake fluid flows in via the first conduit system from the brake device corresponding to the right side driving wheel to the brake device corresponding to the left side non-driving wheel, and brake fluid flows in via the second conduit system from the brake device corresponding to the left side driving wheel to the brake device corresponding to the right side non-driving wheel.

* * * * *